United States Patent
Hutchinson et al.

(10) Patent No.: US 7,367,795 B2
(45) Date of Patent: May 6, 2008

(54) INJECTION MOLD HAVING A WEAR RESISTANT PORTION AND A HIGH HEAT TRANSFER PORTION

(75) Inventors: Gerald A. Hutchinson, Coto de Caza, CA (US); Robert A. Lee, Bowdon Cheshire (GB)

(73) Assignee: Advanced Plastics Technologies Luxembourg S.A., Luxembourg (LU)

( * ) Notice: Subject to any disclaimer, the term of this patent is extended or adjusted under 35 U.S.C. 154(b) by 437 days.

(21) Appl. No.: 10/705,748

(22) Filed: Nov. 10, 2003

(65) Prior Publication Data
US 2004/0151937 A1   Aug. 5, 2004

Related U.S. Application Data

(60) Provisional application No. 60/425,347, filed on Nov. 8, 2002.

(51) Int. Cl.
B29C 45/26 (2006.01)

(52) U.S. Cl. .................................... 425/527; 425/533

(58) Field of Classification Search .............. 425/527, 425/533
See application file for complete search history.

(56) References Cited

U.S. PATENT DOCUMENTS

| | | |
|---|---|---|
| 2,708,288 A | 5/1955 | Fuller et al. |
| 3,224,043 A | 12/1965 | Lameris et al. |
| 3,305,528 A | 2/1967 | Wynstra et al. |
| 3,317,471 A | 5/1967 | Johnson et al. |
| 3,395,118 A | 7/1968 | Reinking et al. |
| 3,418,398 A | 12/1968 | Seefluthy |
| 3,430,680 A | 3/1969 | Leghorn |
| 3,482,284 A | 12/1969 | Rees |
| 3,632,267 A | 1/1972 | Kader |
| 3,719,735 A | 3/1973 | Valyi |
| 3,740,181 A | 6/1973 | Uhlig |
| 3,813,198 A | 5/1974 | Valyi |

(Continued)

FOREIGN PATENT DOCUMENTS

CA  1 174 020   9/1984

(Continued)

OTHER PUBLICATIONS

Mold-Making Handbook, 2nd Edition, pp. 223 and 343, Gunter Mennig, 1998.*

(Continued)

Primary Examiner—Tim Heitbrink
(74) Attorney, Agent, or Firm—Knobbe Martens Olson & Bear, LLP

(57) ABSTRACT

Disclosed is a preferred mold design for producing plastic, injection molded preforms, which may be blow-molded into a container of a final, desired shape. A preferred mold includes a combination of hardened material components and high heat transfer material components to provide a mold having good wear characteristics, for a sufficiently long useful life, and to enable rapid cooling of the injected preform, in order to reduce the cycle time of an injection and cooling cycle. In some arrangements, the hardened materials may form a portion of the preform cavity thereby slowing the rate of cooling in those areas and inducing a semi-crystalline or crystalline structure in the cooled preform.

38 Claims, 16 Drawing Sheets

U.S. PATENT DOCUMENTS

| | | |
|---|---|---|
| 3,819,314 A | 6/1974 | Marcus |
| 3,857,660 A | 12/1974 | Flynn et al. |
| 3,869,056 A | 3/1975 | Valyi |
| 3,878,282 A | 4/1975 | Bonis |
| 3,882,213 A | 5/1975 | Uhlig |
| 3,944,643 A | 3/1976 | Sato et al. |
| 3,947,176 A | 3/1976 | Rainville |
| 3,963,399 A | 6/1976 | Zavasnik |
| 3,966,378 A | 6/1976 | Valyi |
| 4,040,233 A | 8/1977 | Valyi |
| 4,061,705 A | 12/1977 | Marcus |
| 4,065,246 A | 12/1977 | Marcus |
| 4,079,851 A | 3/1978 | Valyi |
| 4,092,391 A | 5/1978 | Valyi |
| 4,108,956 A | 8/1978 | Lee |
| 4,116,606 A | 9/1978 | Valyi |
| 4,145,392 A | 3/1979 | Valyi |
| 4,149,645 A | 4/1979 | Valyi |
| 4,151,247 A | 4/1979 | Hafele |
| 4,151,248 A | 4/1979 | Valyi |
| 4,177,238 A | 12/1979 | Allen |
| 4,208,177 A | 6/1980 | Allen |
| 4,213,751 A | 7/1980 | Fernandez |
| 4,323,341 A | 4/1982 | Valyi |
| 4,357,288 A | 11/1982 | Oas et al. |
| 4,357,296 A | 11/1982 | Hafele |
| 4,375,947 A | 3/1983 | Marcus |
| 4,376,090 A | 3/1983 | Marcus |
| 4,378,963 A | 4/1983 | Schouenberg |
| 4,395,222 A | 7/1983 | Gaiser et al. |
| 4,403,090 A | 9/1983 | Smith |
| 4,438,254 A | 3/1984 | Doorakian et al. |
| 4,451,224 A | 5/1984 | Harding |
| 4,480,082 A | 10/1984 | McLean et al. |
| 4,515,836 A | 5/1985 | Cobbs et al. |
| 4,538,542 A | 9/1985 | Kennon et al. |
| 4,540,543 A | 9/1985 | Thomas et al. |
| 4,560,741 A | 12/1985 | Davis et al. |
| 4,564,541 A | 1/1986 | Taira et al. |
| 4,569,869 A | 2/1986 | Kushida et al. |
| 4,573,596 A | 3/1986 | Slat |
| 4,578,295 A | 3/1986 | Jabarin |
| 4,587,073 A | 5/1986 | Jakobsen |
| 4,590,021 A | 5/1986 | Ota et al. |
| 4,604,044 A | 8/1986 | Hafele |
| 4,604,258 A | 8/1986 | Valyi |
| 4,615,667 A | 10/1986 | Roy |
| 4,615,925 A | 10/1986 | Nilsson |
| 4,646,925 A | 3/1987 | Nohara |
| 4,647,648 A | 3/1987 | Silvis et al. |
| 4,680,001 A | 7/1987 | Waters |
| 4,690,789 A | 9/1987 | Ritchie et al. |
| 4,698,013 A | 10/1987 | Butcher |
| 4,699,809 A | 10/1987 | Maruhashi et al. |
| 4,715,504 A | 12/1987 | Chang et al. |
| 4,717,521 A | 1/1988 | Border et al. |
| 4,741,936 A | 5/1988 | Nohara et al. |
| 4,755,404 A | 7/1988 | Collette |
| 4,818,575 A | 4/1989 | Hirata et al. |
| 4,830,811 A | 5/1989 | Aoki |
| 4,847,129 A | 7/1989 | Collette et al. |
| 4,867,664 A | 9/1989 | Fukuhara |
| 4,871,410 A | 10/1989 | Bonnebat et al. |
| 4,871,507 A | 10/1989 | Ajmera et al. |
| 4,937,130 A | 6/1990 | Clagett et al. |
| 4,940,616 A | 7/1990 | Yatsu et al. |
| 4,955,804 A | 9/1990 | Martell et al. |
| 4,956,143 A | 9/1990 | McFarlane |
| 4,966,544 A | 10/1990 | Mitake |
| 4,980,211 A | 12/1990 | Kushida |
| 5,006,381 A | 4/1991 | Nugent, Jr. et al. |
| 5,071,340 A | 12/1991 | LaBianca |
| 5,077,111 A | 12/1991 | Collette |
| 5,085,821 A | 2/1992 | Nohara |
| 5,089,588 A | 2/1992 | White et al. |
| 5,094,793 A | 3/1992 | Schrenk et al. |
| 5,115,075 A | 5/1992 | Brennan et al. |
| 5,134,218 A | 7/1992 | Brennan et al. |
| 5,143,998 A | 9/1992 | Brennan et al. |
| 5,149,768 A | 9/1992 | White et al. |
| 5,188,787 A | 2/1993 | King et al. |
| 5,202,074 A | 4/1993 | Schrenk et al. |
| 5,219,593 A | 6/1993 | Schmidt et al. |
| 5,246,751 A | 9/1993 | White et al. |
| 5,275,853 A | 1/1994 | Silvis et al. |
| RE34,537 E | 2/1994 | Dyrup |
| 5,300,326 A | 4/1994 | Zezinka et al. |
| 5,300,541 A | 4/1994 | Nugent, Jr. et al. |
| 5,302,417 A | 4/1994 | Yamauchi et al. |
| 5,342,663 A | 8/1994 | Yokobayashi |
| 5,354,532 A | 10/1994 | Nakai et al. |
| 5,376,317 A | 12/1994 | Maus et al. |
| 5,411,698 A | 5/1995 | Mero et al. |
| 5,443,378 A | 8/1995 | Jaroschek et al. |
| 5,443,766 A | 8/1995 | Slat et al. |
| 5,460,761 A | 10/1995 | Larsson |
| 5,464,106 A | 11/1995 | Slat et al. |
| 5,472,753 A | 12/1995 | Farha |
| 5,489,455 A | 2/1996 | Nugent, Jr. et al. |
| 5,491,204 A | 2/1996 | Nugent, Jr. et al. |
| 5,498,150 A | 3/1996 | Check |
| 5,508,076 A | 4/1996 | Bright |
| 5,509,965 A | 4/1996 | Harry et al. |
| 5,540,878 A | 7/1996 | Schrenk et al. |
| 5,551,858 A | 9/1996 | Yoshizawa et al. |
| 5,571,470 A | 11/1996 | Plester |
| 5,582,788 A | 12/1996 | Collette et al. |
| 5,599,494 A | 2/1997 | Marcus |
| 5,628,950 A | 5/1997 | Schrenk et al. |
| 5,628,957 A | 5/1997 | Collette et al. |
| 5,639,848 A | 6/1997 | Nugent, Jr. et al. |
| 5,645,183 A | 7/1997 | Slat et al. |
| 5,651,933 A | 7/1997 | Slat et al. |
| 5,652,034 A | 7/1997 | Seiner |
| 5,653,907 A | 8/1997 | Kendall et al. |
| 5,676,267 A | 10/1997 | Slat et al. |
| 5,688,570 A | 11/1997 | Ruttinger |
| 5,688,572 A | 11/1997 | Slat et al. |
| 5,728,439 A | 3/1998 | Carlblom |
| 5,731,094 A | 3/1998 | Brennan et al. |
| 5,759,653 A | 6/1998 | Collette et al. |
| 5,759,654 A | 6/1998 | Cahill |
| 5,759,656 A | 6/1998 | Collette et al. |
| 5,772,056 A | 6/1998 | Slat |
| 5,780,128 A | 7/1998 | Farha |
| 5,804,305 A | 9/1998 | Slat et al. |
| 5,834,078 A | 11/1998 | Cavitt et al. |
| 5,837,339 A | 11/1998 | Wood et al. |
| 5,851,471 A | 12/1998 | Schloss et al. |
| 5,879,727 A | 3/1999 | Puri |
| 5,894,023 A | 4/1999 | Schramm et al. |
| 5,902,541 A | 5/1999 | Imai et al. |
| 5,906,285 A | 5/1999 | Slat |
| 5,906,787 A | 5/1999 | Plester |
| 5,914,138 A | 6/1999 | Swenson |
| 5,927,525 A | 7/1999 | Darr et al. |
| 5,968,620 A | 10/1999 | Harvey et al. |
| 5,971,742 A | 10/1999 | McCollum et al. |
| 5,972,445 A | 10/1999 | Kimura et al. |
| 5,989,661 A | 11/1999 | Krishnakumar et al. |
| 6,017,209 A | 1/2000 | Gellert et al. |
| 6,051,294 A | 4/2000 | White et al. |
| 6,068,900 A | 5/2000 | Kohn et al. |
| 6,090,460 A | 7/2000 | Collette et al. |

| | | | | | | | |
|---|---|---|---|---|---|---|---|
| 6,099,766 | A | 8/2000 | Aoki et al. | EP | 0 153 120 B1 | 8/1985 | |
| 6,123,211 | A | 9/2000 | Rashid et al. | EP | 0 153 894 B1 | 9/1985 | |
| 6,136,354 | A | 10/2000 | Wood et al. | EP | 0 160 984 B1 | 11/1985 | |
| 6,149,417 | A | 11/2000 | Lusenhammer et al. | EP | 0 176 229 B1 | 4/1986 | |
| 6,168,740 | B1 | 1/2001 | Koch et al. | EP | 0 180 191 B1 | 5/1986 | |
| 6,171,541 | B1 | 1/2001 | Nester et al. | EP | 0 191 701 A2 | 8/1986 | |
| 6,180,715 | B1 | 1/2001 | Schmidt | EP | 0 199 633 B1 | 10/1986 | |
| 6,196,830 | B1 | 3/2001 | Foltuz et al. | EP | 0 203 630 A2 | 12/1986 | |
| 6,312,628 | B1 | 11/2001 | Wieder et al. | EP | 0 215 630 B1 | 3/1987 | |
| 6,312,641 | B1 | 11/2001 | Hutchinson | EP | 0 218 245 B1 | 4/1987 | |
| 6,315,549 | B1 | 11/2001 | Jenko et al. | EP | 0 225 049 A2 | 6/1987 | |
| 6,319,574 | B1 | 11/2001 | Slat | EP | 0 266 900 A2 | 5/1988 | |
| 6,352,426 | B1 | 3/2002 | Hutchinson et al. | EP | 0 278 403 B1 | 8/1988 | |
| 6,365,247 | B1 | 4/2002 | Cahill et al. | EP | 0 280 736 A1 | 9/1988 | |
| 6,372,318 | B1 | 4/2002 | Collette et al. | EP | 0 287 839 A2 | 10/1988 | |
| 6,391,408 | B1 | 5/2002 | Hutchinson | EP | 0 325 030 A2 | 11/1988 | |
| 6,413,075 | B1 | 7/2002 | Sykes et al. | EP | 0 304 059 | 1/1989 | |
| 6,428,305 | B2 | 8/2002 | Jenko | EP | 0 302 117 A1 | 2/1989 | |
| 6,428,737 | B1 | 8/2002 | Collette et al. | EP | 0 306 675 B1 | 3/1989 | |
| 6,461,697 | B1 | 10/2002 | Slat et al. | EP | 0 341 044 B1 | 3/1989 | |
| 6,471,503 | B1 | 10/2002 | Priest et al. | EP | 0 350 745 A2 | 1/1990 | |
| 6,485,804 | B1 | 11/2002 | Nakamachi et al. | EP | 0 351 118 A2 | 1/1990 | |
| 6,524,672 | B1 | 2/2003 | Slat et al. | EP | 0 395 237 A1 | 4/1990 | |
| 6,533,571 | B2 | 3/2003 | Fikani | EP | 0 368 278 A2 | 5/1990 | |
| 6,569,370 | B1 | 5/2003 | Amin et al. | EP | 0 376 469 B1 | 7/1990 | |
| 6,676,883 | B2 | 1/2004 | Hutchinson et al. | EP | 0 462 455 A1 | 6/1991 | |
| 6,808,820 | B2 | 10/2004 | Lee et al. | EP | 0 491 650 | 6/1992 | |
| 6,939,591 | B2 | 9/2005 | Hutchinson et al. | EP | 0 524 572 B1 | 7/1992 | |
| 7,261,551 | B2 | 8/2007 | Hutchinson et al. | EP | 0 544 545 A1 | 11/1992 | |
| 2001/0030163 | A1 | 10/2001 | Rashid et al. | EP | 0 518 703 A2 | 12/1992 | |
| 2002/0001686 | A1 | 1/2002 | Kashiba et al. | EP | 0 518 703 A3 | 12/1992 | |
| 2002/0014722 | A1 | 2/2002 | Baresich | EP | 0 555 976 | 8/1993 | |
| 2002/0028870 | A1 | 3/2002 | Lan et al. | EP | 0 571 116 A1 | 10/1993 | |
| 2002/0048682 | A1 | 4/2002 | Subramanian et al. | EP | 0 583 953 A1 | 12/1993 | |
| 2002/0061371 | A1 | 5/2002 | Schmidt et al. | EP | 0 581 970 A1 | 2/1994 | |
| 2002/0090473 | A1 | 7/2002 | Lee et al. | EP | 0 387 614 B1 | 6/1994 | |
| 2002/0155236 | A1 | 10/2002 | Cahill et al. | EP | 0 671 251 A1 | 9/1995 | |
| 2003/0001315 | A1 | 1/2003 | Hutchinson et al. | EP | 0 678 554 A1 | 10/1995 | |
| 2003/0012904 | A1 | 1/2003 | Hutchinson et al. | EP | 0 689 933 A2 | 1/1996 | |
| 2003/0031814 | A1 | 2/2003 | Hutchinson et al. | EP | 0 767 049 A2 | 10/1996 | |
| 2003/0039779 | A1 | 2/2003 | Share et al. | EP | 0 768 163 | 10/1996 | |
| 2003/0219555 | A1 | 11/2003 | Hutchinson et al. | EP | 0 744 263 A2 | 11/1996 | |
| 2004/0013833 | A1 | 1/2004 | Lee et al. | EP | 0 774 491 A2 | 11/1996 | |
| 2004/0071885 | A1 | 4/2004 | Hutchinson et al. | EP | 0 756 931 A2 | 2/1997 | |
| 2005/0053739 | A1 | 3/2005 | Lee et al. | EP | 0 756 931 A3 | 2/1997 | |
| | | | | EP | 0 653 982 B1 | 9/1997 | |
| | | FOREIGN PATENT DOCUMENTS | | EP | 0 794 007 A1 | 9/1997 | |
| | | | | EP | 1 095 756 | 10/1997 | |
| DE | | 21 08 774 A | 9/1971 | EP | 0 822 213 A1 | 2/1998 | |
| DE | | 26 49 640 | 5/1978 | EP | 0 894 604 A1 | 2/1999 | |
| DE | | 30 44 930 A1 | 10/1981 | EP | 0 964 031 A2 | 12/1999 | |
| DE | | 3407 060 C2 | 4/1986 | EP | 0 837 763 B1 | 12/2001 | |
| DE | | 3518 441 C2 | 3/1987 | FR | 2538297 | 6/1984 | |
| DE | | 3518 875 C2 | 9/1989 | GB | 1482956 | 8/1977 | |
| DE | | 3121 420 C2 | 3/1990 | GB | 2011309 A | 7/1979 | |
| DE | | 3121 421 C2 | 8/1990 | JP | 55-37335 | 3/1980 | |
| DE | | 298 620 A5 | 3/1992 | JP | 57093126 | 6/1982 | |
| DE | | 196 40 662 C1 | 3/1998 | JP | 57-93126 | 10/1982 | |
| EP | | 0 019 438 A1 | 11/1980 | JP | 58092536 | 1/1983 | |
| EP | | 0 100 375 A2 | 9/1982 | JP | 58173634 A | 10/1983 | |
| EP | | 0 073 151 A2 | 2/1983 | JP | 58215309 A | 12/1983 | |
| EP | | 0 212 339 B1 | 4/1983 | JP | 61002519 | 1/1986 | |
| EP | | 0 095 909 B1 | 5/1983 | JP | 61185417 | 8/1986 | |
| EP | | 0 099 727 A2 | 7/1983 | JP | 04074620 A | 3/1992 | |
| EP | | 0 105 826 B1 | 7/1983 | JP | 04197634 | 7/1992 | |
| EP | | 0 092 979 B1 | 11/1983 | JP | 08281892 | 10/1996 | |
| EP | | 0 096 581 B1 | 12/1983 | JP | 10-128839 A | 5/1998 | |
| EP | | 0 126 575 A2 | 5/1984 | JP | 11090975 A | 4/1999 | |
| EP | | 0 118 226 B2 | 9/1984 | JP | 106219 | 4/2001 | |
| EP | | 0 125 107 A1 | 11/1984 | JP | 2003-103324 | 4/2003 | |
| EP | | 0 156 085 B1 | 11/1984 | WO | WO 87/05276 | 9/1987 | |
| EP | | 0 174 265 A2 | 3/1985 | WO | WO 89/08556 | 9/1989 | |
| EP | | 0 171 161 B1 | 6/1985 | WO | WO 90/07553 | 7/1990 | |

| | | |
|---|---|---|
| WO | WO 93/01988 | 7/1991 |
| WO | WO 92/01558 | 2/1992 |
| WO | WO 93/07068 | 4/1993 |
| WO | WO 93/25835 | 12/1993 |
| WO | WO 94/01268 | 1/1994 |
| WO | WO 95/06680 | 8/1994 |
| WO | WO 94/19186 | 9/1994 |
| WO | WO 94/25366 | 11/1994 |
| WO | WO 95/00325 | 1/1995 |
| WO | WO 95/07219 | 3/1995 |
| WO | WO 95/18002 | 6/1995 |
| WO | WO 95/22451 | 8/1995 |
| WO | WO 95/29805 | 11/1995 |
| WO | WO 95/34425 | 12/1995 |
| WO | WO 96/18685 | 12/1995 |
| WO | WO 96/35571 | 3/1996 |
| WO | WO 96/33062 | 4/1996 |
| WO | WO 96/20074 | 7/1996 |
| WO | WO 97/02939 | 1/1997 |
| WO | WO 97/09366 A1 | 3/1997 |
| WO | WO 97/15420 | 5/1997 |
| WO | WO 97/26127 | 7/1997 |
| WO | WO 97/28218 A1 | 8/1997 |
| WO | WO 97/34758 | 9/1997 |
| WO | WO 97/40972 | 11/1997 |
| WO | WO 97/40981 | 11/1997 |
| WO | WO 97/42250 A1 | 11/1997 |
| WO | WO 97/43182 | 11/1997 |
| WO | WO 97/44174 | 11/1997 |
| WO | WO 97/47695 | 12/1997 |
| WO | WO 98/02479 A1 | 1/1998 |
| WO | WO 98/17470 A1 | 4/1998 |
| WO | WO 98/21730 A1 | 5/1998 |
| WO | WO 98/25746 | 6/1998 |
| WO | WO 98/46410 | 10/1998 |
| WO | WO 99/20462 A2 | 4/1999 |
| WO | WO 99/20462 A3 | 4/1999 |
| WO | WO 99/43563 | 9/1999 |
| WO | WO 99/61514 | 12/1999 |
| WO | WO 00/62998 | 10/2000 |
| WO | WO 01/83193 A1 | 11/2001 |
| WO | WO 02/20246 A1 | 3/2002 |
| WO | WO 2004/043675 A1 | 5/2004 |

OTHER PUBLICATIONS

Proceedings of 3rd International Conference on Rigid Polyester Packaging Innovations for Food and Beverages; Nova-Pak Americas '98; Jan. 26-27, 1998.

White et al.; "High-Barrier Structural Thermoplastics Based on Diglycidyl Ethers"; Polymer Science; vol. 34(1); 1993; pp. 904-905.

"Mitsui B-010:Gas Barrier Polyester"; Chemical Data Sheet; Mitsui Chemicals, Inc.; Feb. 1, 1998.

Patent Abstracts of Japan vol. 006, No. 184 (M-157), Sep. 21, 1982 & JP 57 093126 A (Sumitomo Heavy Ind Ltd), Jun. 10, 1982 abstract.

Patent Abstracts of Japan vol. 1997, No. 02 Feb. 28, 1997 & JP 08 281892 A (Mitsubishi Plastics Ind Ltd), Oct. 29, 1996 abstract.

Patent Abstracts of Japan vol. 016, No. 529 (M-1332), Oct. 29, 1992 & JP 04197634 A (Kao Corp), Jul. 17, 1992 abstract.

The Condensed Chemical Dictionary, 1981, p. 65.

Yukihiko Suematsu; Growth Prospects & Challenges for Pet in Asia/Japan: A Producer's Perspective, date unknown.

PCT International Search Report: mailed Jan. 28, 2002 for International Application No. PCT/US 01/28128, Filed on Sep. 5, 2001.

"Konzepte Fuer Die Werkzeugtemperierung Eine Uebersicht Mit Erfahrungen Aus Der Praxis" Dunststoffe, Carl Hanser Verlag. Munchen, DE, vol. 92, No. 11, Nov. 2002, pp. 28-36, XP001121639 ISSN: 0023-5563 p. 30, col. 3, last paragraph p. 31, col. 3 paragraph 1.

PCT International Search Report: mailed Mar. 30, 2004 for International Application No. PCT/US 03/35949, Filed Nov. 10, 2003.

Patent Abstracts of Japan JP 07156349 (Kureha Chem Ind Co Ltd Kureha Plast KK), date unknown.

Patent Abstracts of Japan JP09296056 (Nippon Ester Co Ltd), date unknown.

"Tool Steel Recommendations for Injection Molds Designed for Processing Geon® Vinyl Compounds," Technical Service Report, No. 12; Apr. 1996.

* cited by examiner

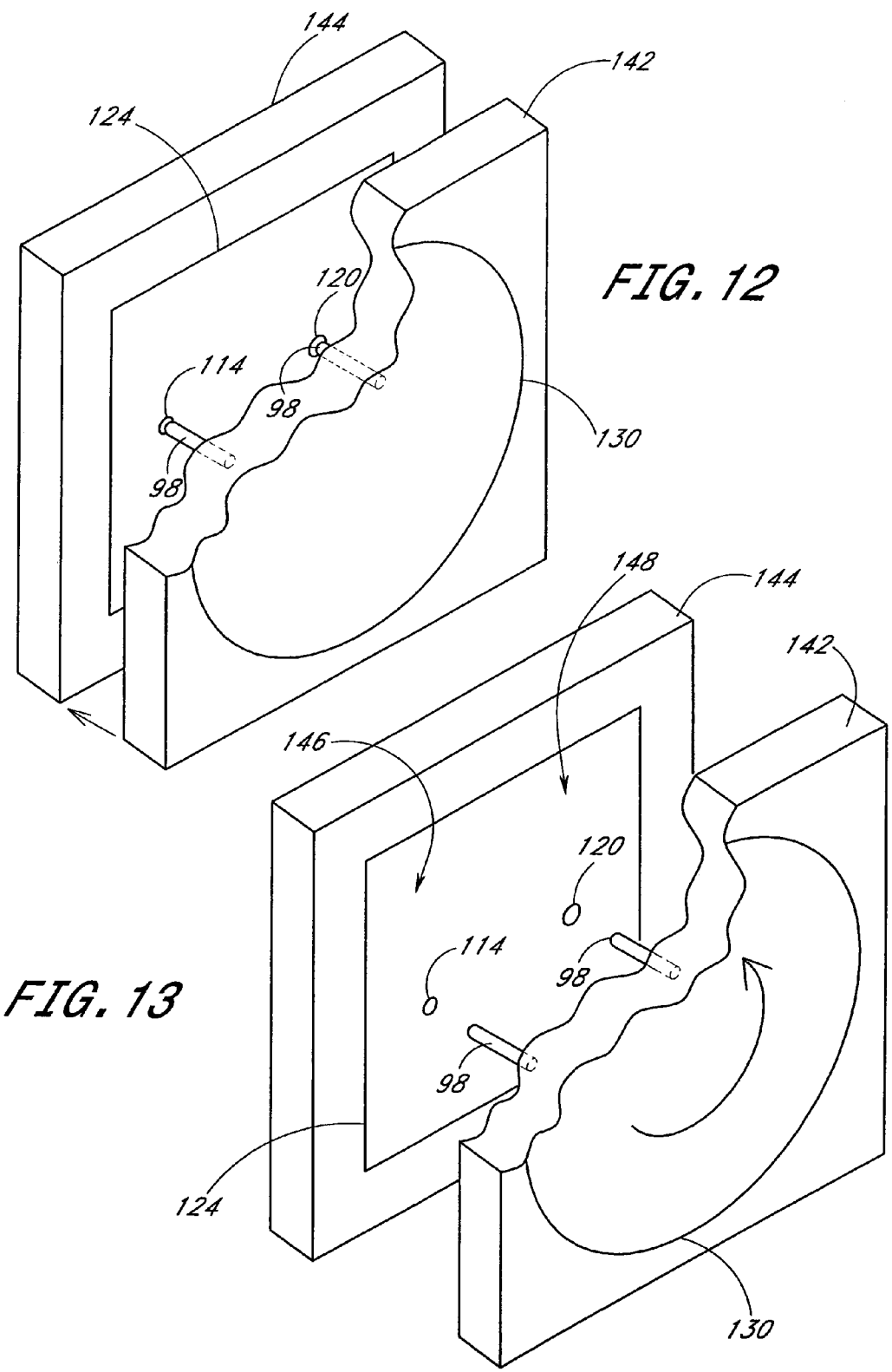

INJECTION MOLD HAVING A WEAR RESISTANT PORTION AND A HIGH HEAT TRANSFER PORTION

RELATED APPLICATIONS

This application relates to and claims the benefit of the provisional application 60/425,347, filed Nov. 8, 2002, which is hereby incorporated by reference in its entirety.

BACKGROUND OF THE INVENTION

1. Field of the Invention

This invention relates to molds for producing preforms, which are then molded into plastic bottles and containers, such as for containing beverages and the like. More specifically, this invention relates to an improved mold design having a combination of hardened material components and high heat transfer material components.

2. Description of the Related Art

The use of plastic containers as a replacement for glass or metal containers in the packaging of beverages has become increasingly popular. The advantages of plastic packaging include lighter weight, decreased breakage as compared to glass, and potentially lower costs. The most common plastic used in making beverage containers today is PET. Virgin PET has been approved by the FDA for use in contact with foodstuffs. Containers made of PET are transparent, thin-walled, lightweight, and have the ability to maintain their shape by withstanding the force exerted on the walls of the container by pressurized contents, such as carbonated beverages. PET resins are also fairly inexpensive and easy to process.

Most PET bottles are made by a process that includes the blow-molding of plastic preforms, which have been made by processes including injection molding. In order to increase the through-put of an injection molding machine, and thereby decrease the cost of each individual preform, it is desirable to reduce the cycle time for each injection and cooling cycle. However, the injected preform must cool sufficiently to maintain its molded dimensions before it is removed from the injection mold. Therefore, it would be desirable to utilize high heat transfer materials to form the injection mold in order to rapidly cool the injected preform. However, such high heat transfer materials are generally prone to rapid wear when used in such an environment, where high clamping pressures are necessary to maintain the injection mold in a closed position during the injection of molten polymer into the mold cavity. As a result, the potential of such high heat transfer materials have not previously been fully realized in the injection molding of preforms.

SUMMARY OF THE INVENTION

A preferred embodiment involves a preform mold having a cavity section and a core section movable from an open position to a closed position with respect to one another, wherein, in the closed position, a clamping force is applied to the preform mold. Each of the cavity section and the core section define a contact surface and a mold surface. The contact surfaces of the cavity section and the core section contact one another when the mold is in the closed position. The mold surfaces of the cavity section and the core section cooperate to form a preform mold cavity. A portion of the cavity section forming the contact surface and a portion of the core section forming the contact surface comprise a hardened material. A portion of the cavity section forming at least a portion of the mold surface and a portion of the core forming at least a portion of the mold surface comprise a high heat transfer material.

In one embodiment, the core section of the mold may comprise a core member and a core holder. The core holder defining the contact surface of the core section and the core member defining the at least a portion of the mold surface of the core section.

In another embodiment, the cavity section may comprise a first portion defining the contact surface and a second portion defining at least a portion of the mold surface. In some arrangements, the first portion of the cavity section may comprise a thread ring and the second portion of the cavity may comprise a main cavity portion. The thread ring and the main cavity portion may each include a contact surface that contact one another. The contact surfaces of the thread ring and the main cavity portion are preferably comprised of a hardened material. Furthermore, the main cavity portion may comprise a hardened material portion and a high heat transfer material portion.

In one embodiment, an injection mold assembly comprises a cavity section that has a first portion and a second portion. The first portion comprises a hardened material that defines a cavity contact surface. The second portion comprises a high heat transfer material and defines a cavity mold surface. The injection mold assembly further comprises a core section has at least a core contact surface and a core mold surface. A portion of the core section forms the core contact surface that comprises a hardened material. The injection mold assembly further comprises a mold cavity that has a distal end and a proximal end that are formed by the cavity mold surface and the core mold surface when a portion of the cavity contact surface and a portion of the core contact surface are in contact. The distal end of the mold cavity is formed by the second portion of the cavity section.

In one embodiment, an injection mold assembly comprises a mold cavity, a core section, and a cavity section. The mold cavity has an internal surface and an external surface. The external surface has a region configured to surround a gate. A core section comprises a core member and a core holder. The core holder holds the core member, which defines at least a portion of the internal surface of the mold cavity. The cavity section comprises an upper hardened portion and a gate portion. The upper hardened portion forms a lower contact surface and comprises a hardened material. The gate portion comprises a high heat transfer material forming the region of the external surface surrounding the gate, each of the portions defines a portion of the external surface of the mold cavity.

In one embodiment, a preform mold assembly comprises a core section and a cavity section. The core section has a core contact surface formed of a hardened material. The cavity section comprises an upper portion and a lower portion. The upper portion comprises a hardened material and has an upper contact surface configured to mate and contact the core contact surface. The lower portion comprises a high heat transfer material.

In one embodiment, a method of forming a preform that comprises providing a core section that has a core contact surface formed of a hardened material. A cavity section is provided that comprises an upper portion and a lower portion. The upper portion comprises a hardened material and has an upper contact surface configured to mate and contact the core contact surface. The lower portion comprises a high heat transfer material. A mold cavity is provided between the core section and the cavity section. A moldable material is injected into the mold cavity.

In one embodiment, a preform is formed by the process that comprises providing a cavity section that has a first portion and a second portion. The first portion comprises a hardened material that defines a cavity contact surface. The second portion comprises a high heat transfer material and defines a cavity mold surface. A core section is provided that has a core contact surface and a core mold surface. A portion of the core forms the core contact surface and comprises a hardened material. A mold cavity is provided that has a distal end and a proximal end and is formed by the cavity mold surface and the core mold surface when a portion of the cavity contact surface and a portion of the core contact surface are in contact. The distal end of the mold cavity is formed by the second portion of the cavity section.

In one embodiment, an injection mold assembly comprises a lower portion, an upper portion, and a mold cavity having a distal end and a proximal end. The injection mold assembly further comprises means for mating the lower portion and the upper portion, means for transferring heat at a first rate from the distal end of the mold cavity and a second rate from the proximal end of the mold cavity, and means of inhibiting wear of the injection mold assembly when the lower portion and the upper portion mate.

In one embodiment, a mold insert comprises an upper portion that comprises a wear resistant material adapted to contact and mate with a core section. Preferably, a lower portion is adapted to connect with a cavity section that comprises a high heat transfer material and defining a cavity mold surface.

BRIEF DESCRIPTION OF THE DRAWINGS

FIG. 12 is a perspective view of a schematic of a mold with mandrels partially located within the molding cavities.

FIG. 13 is a perspective view of a mold with mandrels fully withdrawn from the molding cavities, prior to rotation.

DETAILED DESCRIPTION OF THE PREFERRED EMBODIMENT

Figure 1:
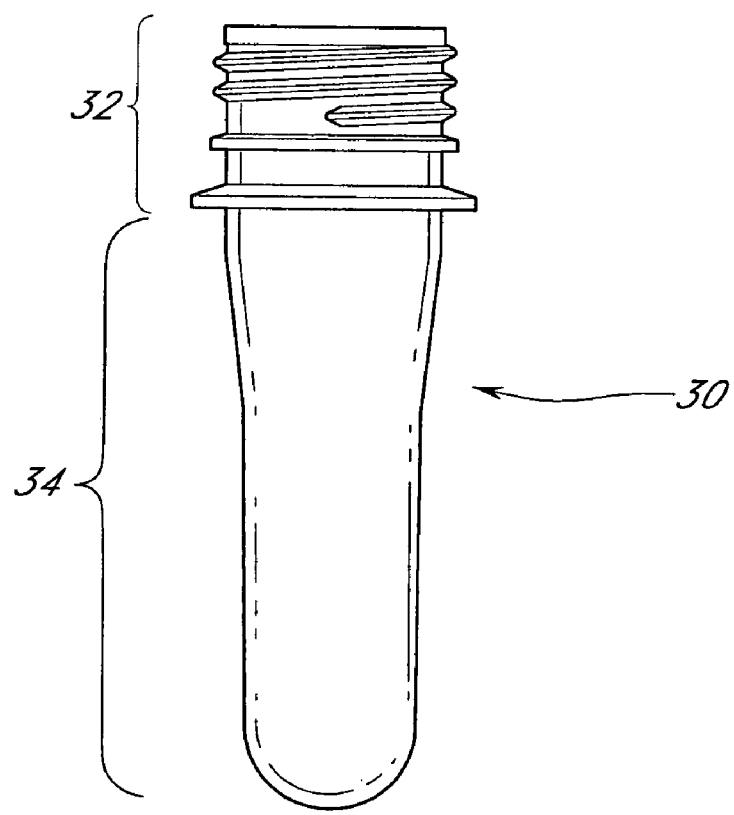
FIG. 1 is an uncoated preform as is used as a starting material for preferred embodiments of the present invention.

The preferred embodiments described herein generally produce preforms with a crystalline neck, which are typically then blow-molded into beverage containers. The preforms may be monolayer; that is, comprised of a single layer of a base material, or they may be multilayer, including, but not limited to, those which comprise a combination of a base material and a barrier material and a combination of a base material and RPET. The material in such layers may be a single material or it may be a blend of one or more materials so as to include blends of polymers and/or inclusion of an oxygen scavenging material. The provision of one or more barrier layers, or the inclusion of an oxygen scavenger in one or more layers, is generally desirable when the container is to be filled with a carbonated beverage or oxygen sensitive product. The barrier layer serves to prevent the ingress of oxygen into the container or the egress of carbon dioxide from the container. Additionally, multiple barrier layers may be provided to refine barrier properties or provide desirable structural properties. For the sake of convenience, the barrier layer will be referred to in the singular, but is intended to include multiple barrier layers where appropriate and desired.

At least one of the preferred embodiments is provided with a barrier layer as described above. As such, the description may often refer to a barrier coated preform or finished bottle. References to barrier coated preform, however, should not give the impression that the present invention is confined only to multilayer preforms and containers which comprise a base layer of PET and a second layer or barrier coating; monolayer preforms comprised of homopolymers or copolymers of PET or other such crystalline polymers and polyesters, multilayer preforms having more than two layers, preforms having at least one layer comprising RPET, and other such permutations including the materials noted above may also be made to have the crystallized thread and/or neck components described herein.

Furthermore, the embodiments described herein specifically describe use of polyethylene terephthalate (PET) but many other thermoplastics, including those of the polyester type may also be used. Examples of such other materials include polyethylene naphthalate (PEN), PETG, polytetramethylene 1,2-dioxybenzoate, copolymers of ethylene terephthalate and ethylene isophthalate, and Polyamide Blends, and recycled materials, such as RPET.

In especially preferred embodiments, "high IPA PET" is used as the polyester which is barrier coated. As it is used herein, the term "high-IPA PET" refers to PET to which IPA was added during to manufacture to form a copolymer in which the IPA content is more than about 2% by weight, preferably 2-10% IPA by weight, more preferably 3-8%, most preferably about 4-5% IPA by weight. The most preferred range is based upon current FDA regulations, which do not allow for PET materials having an IPA content of more than 5% to be in contact with food or drink. If such regulations are not a concern, then an IPA content of 5-10% is preferred. As used herein, "PET" includes "high IPA PET."

The high-IPA PET (more than about 2% by weight) is preferred because the inventor has surprisingly discovered that use of high-IPA PET in the processes for making barrier preforms and containers, provides for better interlayer adhesion than is found in those laminates comprising PET with no IPA or low IPA. Additionally, it has been found that interlayer adhesion improves as the IPA content rises. Incorporation of the higher amounts of IPA into the PET results in a decrease in the rate of crystallization of the high IPA PET material as compared to PET homopolymer, or PET having lower amounts of IPA. The decrease in the rate of crystallization allows for the production of PET layers (made of high IPA PET) having a lower level of crystallinity than what is achieved with low-IPA PET or homopolymer PET when they are made into barrier preforms by similar procedures. The lower crystallinity of the high-IPA PET is important in reducing crystallinity at the surface of the PET, i.e. the interface between the PET and the barrier material. Lower crystallinity allows for better adhesion between the layers and also provides for a more transparent container following blow molding of the preform.

While a non-crystalline preform is preferred for blow-molding, a bottle having greater crystalline character is preferred for its dimensional stability during a hot-fill process. Accordingly, a preform constructed according to preferred embodiments has a generally non-crystalline body portion and a generally crystalline neck portion. To create generally crystalline and generally non-crystalline portions in the same preform, one needs to achieve different levels of heating and/or cooling in the mold in the regions from which crystalline portions will be formed as compared to those in which generally non-crystalline portions will be formed. The different levels of heating and/or cooling are preferably maintained by thermal isolation of the regions having different temperatures. This thermal isolation between the thread split, core and/or cavity interface can be accomplished utilizing a combination of low and high thermal conduct materials as inserts or separate components at the mating surfaces of these portions.

The cooling of the mold in regions which form preform surfaces for which it is preferred that the material be generally amorphous or semi-crystalline, is accomplished by chilled fluid circulating through the mold cavity and core. In preferred embodiments, a mold set-up similar to conventional injection molding applications is used, except that there is an independent fluid circuit or electric heating system for the portions of the mold from which crystalline portions of the preform will be formed.

Preferably, the preforms and containers have the barrier coating disposed on their outer surfaces or within the wall of the container. In contrast with the technique of Slat, which produces multilayered preforms in which the layers are readily separated, in preferred embodiments disclosed herein the thermoplastic barrier material adheres directly and strongly to the PET surface and is not easily separated therefrom. Adhesion between the layers results without the use of any additional materials such as an adhesive material or a tie layer. The coated preforms are processed, preferably by stretch blow molding to form bottles using methods and conditions similar to those used for uncoated PET preforms. The containers which result are strong, resistant to creep, shrinkage and are cosmetically appealing as well as having good gas-barrier properties.

One or more layers of a barrier material are employed in carrying out the methods of and making the articles according to preferred embodiments. As used herein, the terms "barrier material", "barrier resin" and the like refer to materials which, when used to form articles, preferably have key physical properties similar to PET, adhere well to PET, and have a lower permeability to oxygen and carbon dioxide than PET.

Once a suitable barrier material is chosen, an apparatus and method for economically manufacturing a container using the barrier material is necessary. One important method and apparatus involves using an injection molding machine in conjunction with a mold comprising a mandrel or core and a cavity. A first layer of a preform is molded between the mandrel and a first cavity of the mold when a molten polyester is injected therein. The first layer remains on the mandrel when the mandrel is pulled out of the cavity, moved, and inserted into a second mold cavity. A second layer of the material, preferably a barrier layer or a layer comprising barrier material, is then injected over the existing first preform layer. The mandrel and accompanying preform are then removed from the second cavity and a robot removes the preform from the mandrel. While the robot cools the molded preform, the mandrel is available for another molding cycle.

A number of barrier materials having the requisite low permeability to gases such as oxygen and carbon dioxide are useful in preferred embodiments, the choice of barrier material being partly dependent upon the mode or application as described below. Preferred barrier materials for use in barrier coatings include those which fall into two major categories: (1) copolyesters of terephthalic acid, isophthalic acid, and at least one diol having good barrier properties as compared to PET, such as those disclosed in U.S. Pat. No. 4,578,295 to Jabarin, and which is commercially available as B-010 (Mitsui Petrochemical Ind. Ltd., Japan); and (2) hydroxy-functional poly(amide-ethers) such as those described in U.S. Pat. Nos. 5,089,588 and 5,143,998, poly (hydroxy amide ethers) such as those described in U.S. Pat. No. 5,134,218, polyethers such as those described in U.S. Pat. Nos. 5,115,075 and 5,218,075, hydroxy-functional polyethers such as those as described in U.S. Pat. No. 5,164,472, hydroxy-functional poly(ether sulfonamides) such as those described in U.S. Pat. No. 5,149,768, poly (hydroxy ester ethers) such as those described in U.S. Pat. No. 5,171,820, hydroxy-phenoxyether polymers such as those described in U.S. Pat. No. 5,814,373, and poly(hydroxyamino ethers) ("PHAE") such as those described in U.S. Pat. No. 5,275,853. The barrier materials described in (1) above are referred to herein by the term "Copolyester Barrier Materials". The compounds described in the patents in (2) above are collectively categorized and referred to herein by the term "Phenoxy-type Thermoplastic" materials. All the patents referenced in this paragraph are hereby incorporated in their entireties into this disclosure by this reference thereto.

Preferred Copolyester Barrier Materials have FDA approval. FDA approval allows for these materials to be used in containers where they are in contact with beverages and the like which are intended for human consumption. To the inventor's knowledge, none of the Phenoxy-type Thermoplastics have FDA approval as of the date of this disclosure. Thus, these materials are preferably used in multi-layered containers in locations that do not directly contact the contents, if the contents are ingestible, or the mouth of the consumer when drinking from the container.

In carrying out preferred methods to form barrier coated preforms and bottles, an initial preform is coated with at least one additional layer of material comprising barrier material, polyesters such as PET, post-consumer or recycled PET (collectively recycled PET), and/or other compatible thermoplastic materials. A coating layer may comprise a single material, a mix or blend of materials (heterogeneous or homogeneous), an interwoven matrix of two or more materials, or a plurality of microlayers (lamellae) comprised of at least two different materials. Initial preforms preferably comprise polyester, preferably virgin materials which are approved by the FDA for being in contact with foodstuffs.

Thus the preforms and containers according to preferred embodiments may exist in several forms, including, but not limited to: virgin PET coated with a layer of barrier material; virgin PET coated with a layer of material comprising alternating microlayers of barrier material and recycled PET; virgin PET coated with a barrier layer which is in turn coated with recycled PET; microlayers of virgin PET and a barrier material coated with a layer of recycled PET; virgin PET having an oxygen scavenger therein coated with recycled PET (RPET), virgin PET having an oxygen scavenger therein coated with recycled PET (RPET) which is coated with a layer of barrier material, or virgin PET coated with recycled PET which is then coated with barrier material. Other such variations and permutations of layer and material combinations are also within the scope of the disclosure and are presently contemplated.

As described previously, preferred barrier materials include Copolyester Barrier Materials and Phenoxy-type Thermoplastics. Other preferred barrier materials include polyamide barrier materials such as Nylon MXD-6 from Mitsubishi Gas Chemical (Japan). Other preferred barrier materials, referred to herein as "Polyamide Blends." Polyamide Blends as used herein shall include those polyamides containing PET or other polyesters, whether such polyester was included by blending, compounding or reacting. Other barrier materials having similar properties may be used in lieu of these barrier materials. For example, the barrier material may take the form of other thermoplastic polymers, such as acrylic resins including polyacrylonitrile polymers, acrylonitrile styrene copolymers, polyamides, polyethylene naphthalate (PEN), PEN copolymers, and PET/PEN blends.

Preferred barrier materials in accordance with embodiments of the present invention have oxygen and carbon dioxide permeabilities which are less than one-third those of polyethylene terephthalate. For example, the Copolyester Barrier Materials preferably exhibit a permeability to oxygen of about 11 cc mil/100 $in^2$ day and a permeability to carbon dioxide of about 2 cc mil/100 $in^2$ day. For certain PHAEs, the permeability to oxygen is less than 1 cc mil/100 $in^2$ day and the permeability to carbon dioxide is 3.9 cc mil/100 $in^2$ day. The corresponding $CO_2$ permeability of polyethylene terephthalate, whether in the recycled or virgin form, is about 12-20 cc mil/100 $in^2$ day.

For embodiments in which the container is heat set during or after blow-molding, it is preferred that the materials which form the container or article can exist in a form which is at least partially crystalline, more preferably primarily crystalline. Accordingly, for such embodiments, preferred barrier materials include PEN, Copolyesters, Polyamide Blends, and Phenoxy-type Thermoplastics which can exist in partially crystalline or primarily crystalline form.

The methods of preferred embodiments provide for a coating to be placed on a preform which is later blown into a bottle. In many cases, such methods are preferable to placing coatings on the bottles themselves. However, in accordance with other preferred embodiments, one or more coating layers may be placed on a bottle or container itself. Preforms are smaller in size and of a more regular shape than the containers blown therefrom, making it simpler to obtain an even and regular coating. Furthermore, bottles and containers of varying shapes and sizes can be made from preforms of similar size and shape. Thus, the same equipment and processing can be used to produce preforms to form several different kinds of containers. The blow-molding may take place soon after molding, or preforms may be made and stored for later blow-molding. If the preforms are stored prior to blow-molding, their smaller size allows them to take up less space in storage.

Even though it is preferable to form containers from coated preforms as opposed to coating containers themselves, they have generally not been used because of the difficulties involved in making containers from coated or multi-layer preforms. One step where the greatest difficulties arise is during the blow-molding process to form the container from the preform. During this process, defects such as delamination of the layers, cracking or crazing of the coating, uneven coating thickness, and discontinuous coating or voids can result. These difficulties can be overcome by using suitable barrier materials and coating the preforms in a manner that allows for good adhesion between the layers.

Thus, one aspect is the choice of a suitable barrier material, for those embodiments which include barrier materials. When a suitable barrier material is used, the coating sticks directly to the preform without any significant delamination, and will continue to stick as the preform is blow-molded into a bottle and afterwards. Use of a suitable barrier material also helps to decrease the incidence of cosmetic and structural defects which can result from blow-molding containers as described above.

It should be noted that although most of the discussion, drawings, and examples of making coated preforms deal with two layer preforms or bottles incorporating barrier layers, such discussion is not intended to limit the present invention to two layer barrier articles. The disclosure should be read to include, incorporate and describe articles having one or more layers, each layer of which is independently selected from the materials disclosed herein and materials similar thereto.

The two layer barrier containers and preforms according to preferred embodiments are suitable for many uses and are cost-effective because of the economy of materials and processing steps. However, in some circumstances and for some applications, preforms consisting of more than two layers may be desired. Use of three or more layers allows for incorporation of materials such as recycled PET, which is generally less expensive than virgin PET or the preferred barrier materials. Thus, it is contemplated that all of the methods for producing the barrier-coated preforms which are disclosed herein and all other suitable methods for making such preforms may be used, either alone or in combination to produce barrier-coated preforms and containers comprised of two or more layers.

In another aspect of the present invention, preforms and containers, including those which incorporate RPET, may be treated with additional external coatings through dip or spray processes. The materials dipped or sprayed upon the containers or preforms include, but are not limited to, solutions or dispersions of Phenoxy-type thermoplastics.

Referring to FIG. 1, a preferred uncoated preform 30 is depicted. The preform is preferably made of an FDA approved material such as virgin PET and can be of any of a wide variety of shapes and sizes. The preform shown in FIG. 1 is of the type which will form a 16 oz. carbonated beverage bottle that requires an oxygen and carbon dioxide barrier, but as will be understood by those skilled in the art, other preform configurations can be used depending upon the desired configuration, characteristics and use of the final article. The uncoated preform 30 may be made by injection molding as is known in the art or by methods disclosed herein.

Figure 2:
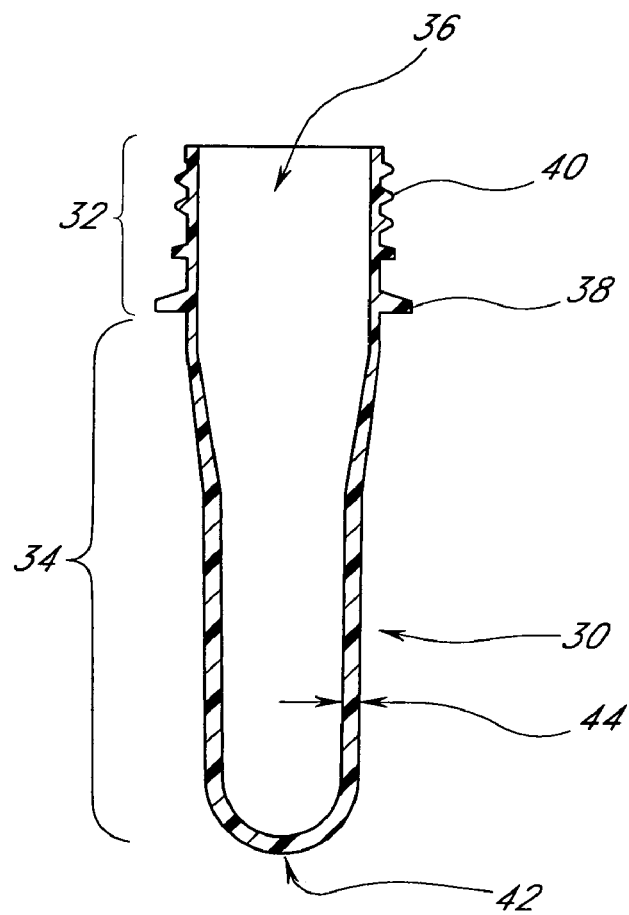
FIG. 2 is a cross-section of a preferred uncoated preform of the type that is barrier-coated in accordance with one preferred embodiment.

Referring to FIG. 2, a cross-section of the preferred uncoated preform 30 of FIG. 1 is depicted. The uncoated preform 30 has a neck portion 32 and a body portion 34, formed monolithically (i.e., as a single, or unitary, structure). Advantageously, the monolithic arrangement of the preform, when blow-molded into a bottle, provides greater dimensional stability and improved physical properties in comparison to a preform constructed of separate neck and body portions, which are bonded together.

The neck portion 32 begins at the opening 36 to the interior of the preform 30 and extends to and includes the support ring 38. The neck portion 32 is further characterized by the presence of the threads 40, which provide a way to fasten a cap for the bottle produced from the preform 30. The body portion 34 is an elongated and cylindrically shaped structure extending down from the neck portion 32 and culminating in the rounded end cap 42. The preform thickness 44 will depend upon the overall length of the preform 30 and the wall thickness and overall size of the resulting container.

Figure 3:
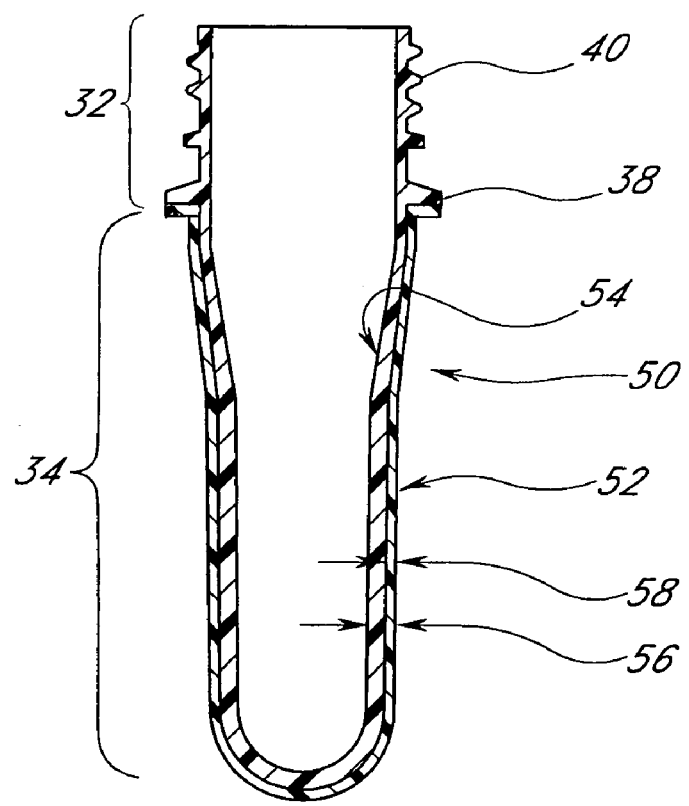
FIG. 3 is a cross-section of one preferred embodiment of barrier-coated preform.

Referring to FIG. 3, a cross-section of one type of barrier-coated preform 50 having features in accordance with a preferred embodiment is disclosed. The barrier-coated preform 50 has a neck portion 32 and a body portion 34 as in the uncoated preform 30 in FIGS. 1 and 2. The barrier coating layer 52 is disposed about the entire surface of the body portion 34, terminating at the bottom of the support ring 38. A barrier coating layer 52 in the embodiment shown in the figure does not extend to the neck portion 32, nor is it present on the interior surface 54 of the preform which is preferably made of an FDA approved material such as PET. The barrier coating layer 52 may comprise either a single material or several microlayers of at least two materials. The overall thickness 56 of the preform is equal to the thickness of the initial preform plus the thickness 58 of the barrier layer, and is dependent upon the overall size and desired coating thickness of the resulting container. By way of example, the wall of the bottom portion of the preform may have a thickness of 3.2 millimeters; the wall of the neck, a cross-sectional dimension of about 3 millimeters; and the barrier material applied to a thickness of about 0.3 millimeters.

Figure 4:
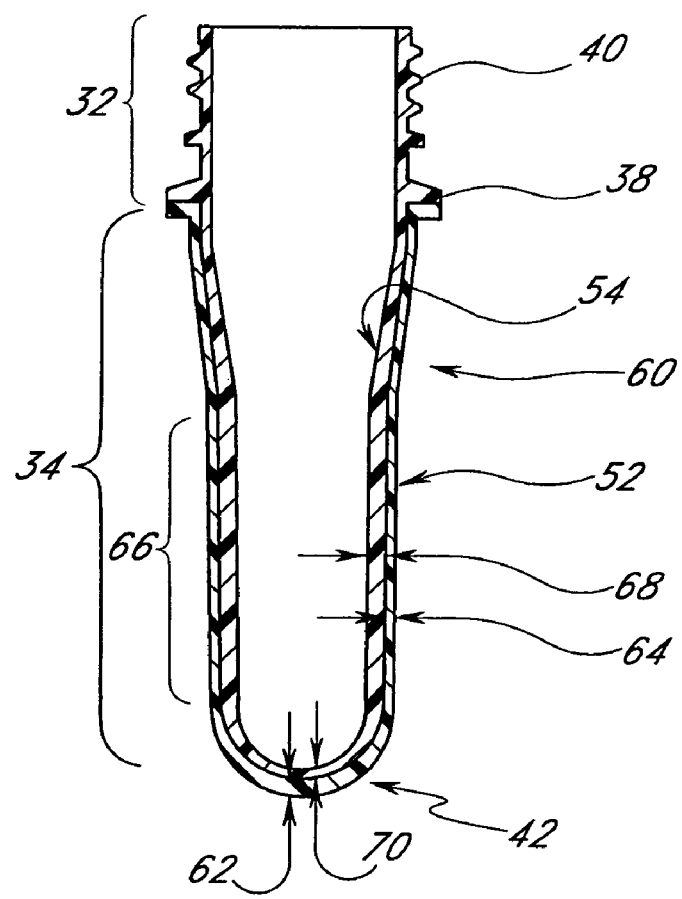
FIG. 4 is a cross-section of another preferred embodiment of a barrier-coated preform.

Referring to FIG. 4, a preferred embodiment of a coated preform 60 is shown in cross-section. The primary difference between the coated preform 60 and the coated preform 50 in FIG. 3 is the relative thickness of the two layers in the area of the end cap 42. In coated preform 50, the barrier layer 52 is generally thinner than the thickness of the initial preform throughout the entire body portion of the preform. In coated preform 60, however, the barrier coating layer 52 is thicker at 62 near the end cap 42 than it is at 64 in the wall portion 66, and conversely, the thickness of the inner polyester layer is greater at 68 in the wall portion 66 than it is at 70, in the region of the end cap 42. This preform design is especially useful when the barrier coating is applied to the initial preform in an overmolding process to make the coated preform, as described below, where it presents certain advantages including that relating to reducing molding cycle time. These advantages will be discussed in more detail below. The barrier coating layer 52 may be homogeneous or it may be comprised of a plurality of microlayers.

The barrier preforms and containers can have layers which have a wide variety of relative thicknesses. In view of the present disclosure, the thickness of a given layer and of the overall preform or container, whether at a given point or over the entire container, can be chosen to fit a coating process or a particular end use for the container. Furthermore, as discussed above in regard to the barrier coating layer in FIG. 3, the barrier coating layer in the preform and container embodiments disclosed herein may comprise a single material or several microlayers of two or more materials.

Figure 5:
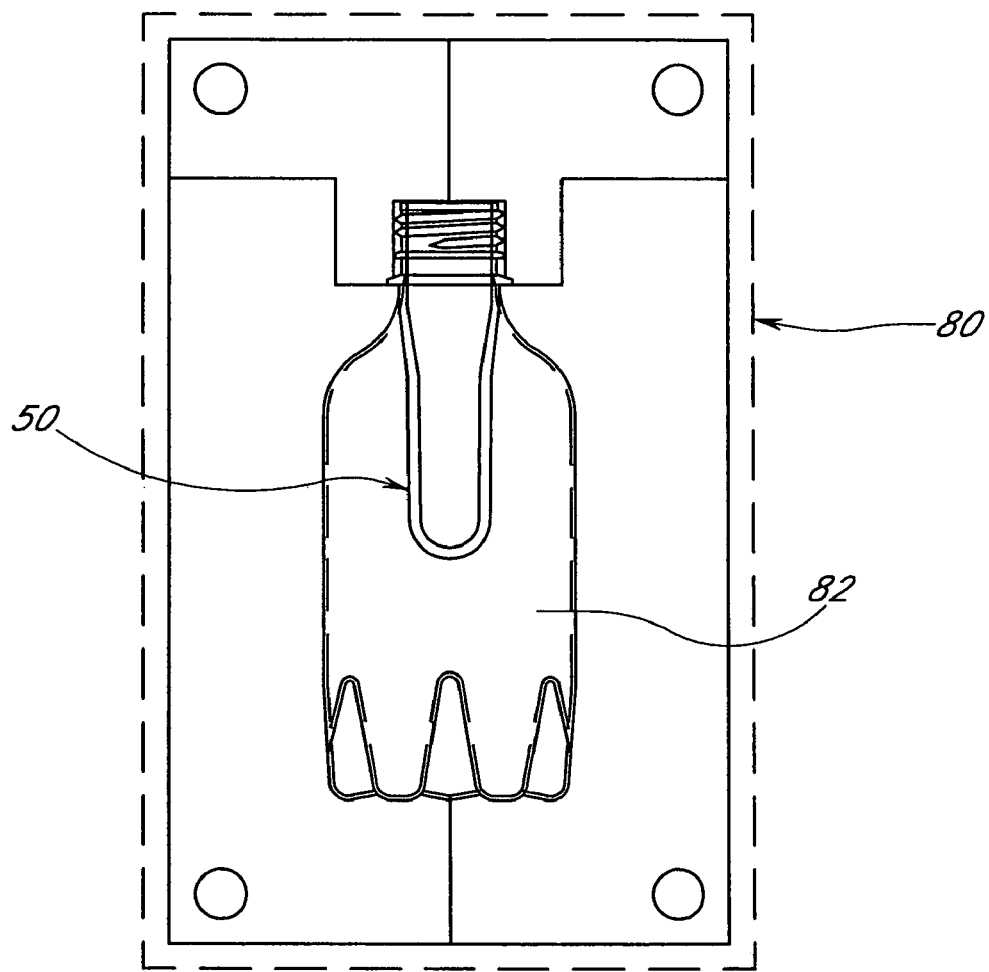
FIG. 5 is a cross-section of a preferred preform in the cavity of a blow-molding apparatus of a type that may be used to make a preferred barrier-coated container.

After a barrier-coated preform, such as that depicted in FIG. 3, is prepared by a method and apparatus such as those discussed in detail below, it is subjected to a stretch blow-molding process. Referring to FIG. 5, in this process a barrier-coated preform 50 is placed in a mold 80 having a cavity corresponding to the desired container shape. The barrier-coated preform is then heated and expanded by stretching and by air forced into the interior of the preform 50 to fill the cavity within the mold 80, creating a barrier-coated container 82. The blow molding operation normally is restricted to the body portion 34 of the preform with the neck portion 32 including the threads, pilfer ring, and support ring retaining the original configuration as in the preform.

Figure 6:
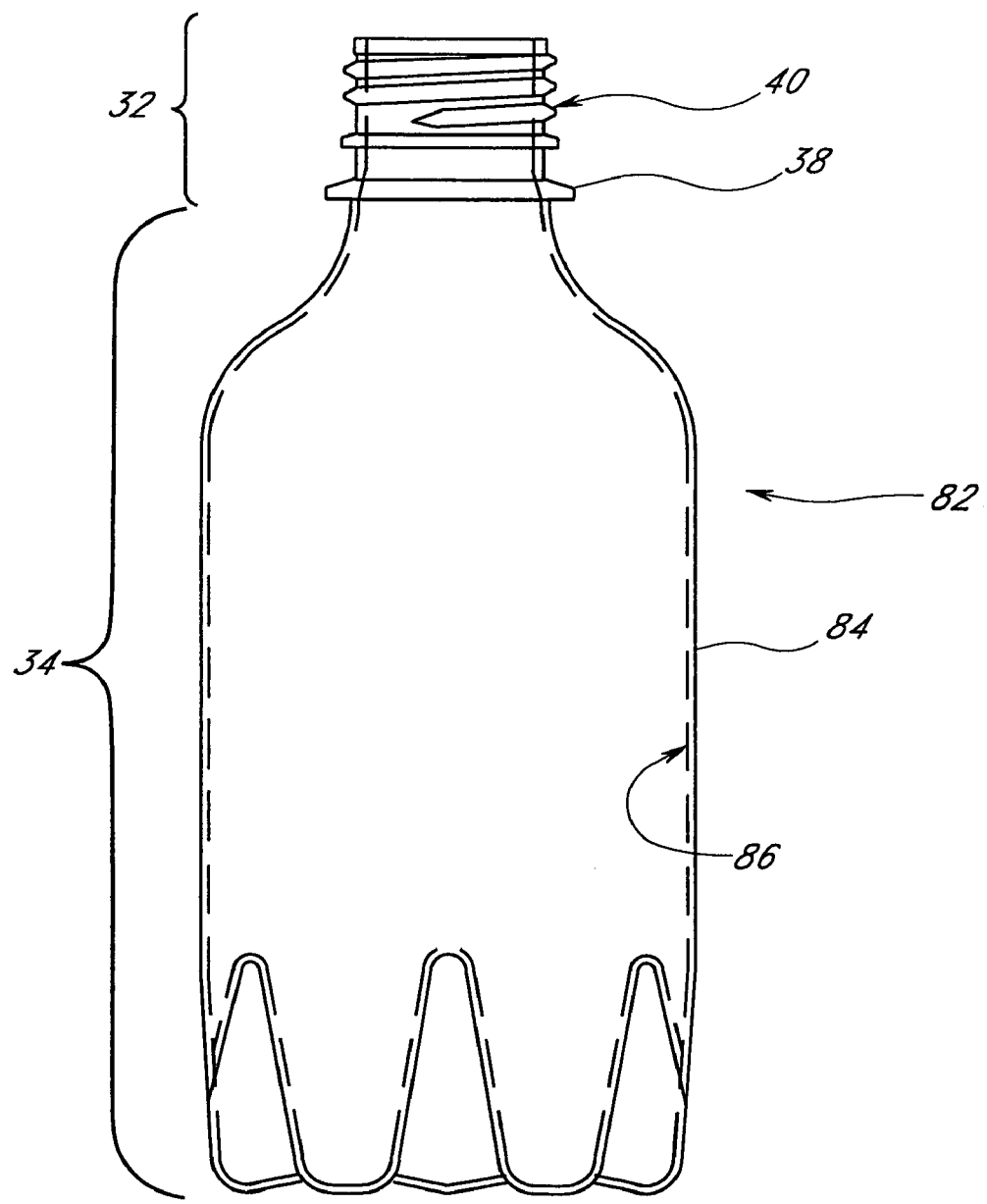
FIG. 6 is one preferred embodiment of barrier-coated container.

Referring to FIG. 6, there is disclosed an embodiment of barrier coated container 82 in accordance with a preferred embodiment, such as that which might be made from blow molding the barrier coated preform 50 of FIG. 3. The container 82 has a neck portion 32 and a body portion 34 corresponding to the neck and body portions of the barrier-coated preform 50 of FIG. 3. The neck portion 32 is further characterized by the presence of the threads 40 which provide a way to fasten a cap onto the container.

The barrier coating 84 covers the exterior of the entire body portion 34 of the container 82, stopping just below the support ring 38. The interior surface 86 of the container, which is made of an FDA-approved material, preferably PET, remains uncoated so that only the interior surface 86 is in contact with beverages or foodstuffs. In one preferred embodiment that is used as a carbonated beverage container, the thickness of the barrier coating is preferably 0.020-0.060 inch, more preferably 0.030-0.040 inch; the thickness of the PET layer is preferably 0.080-0.160 inch, more preferably 0.100-0.140 inch; and the overall wall thickness of the barrier-coated container 82 is preferably 0.140-0.180 inch, more preferably 0.150-0.170 inch. Preferably, on average, the overall wall thickness of the container 82 derives the majority of its thickness from the inner PET layer.

Figure 7:
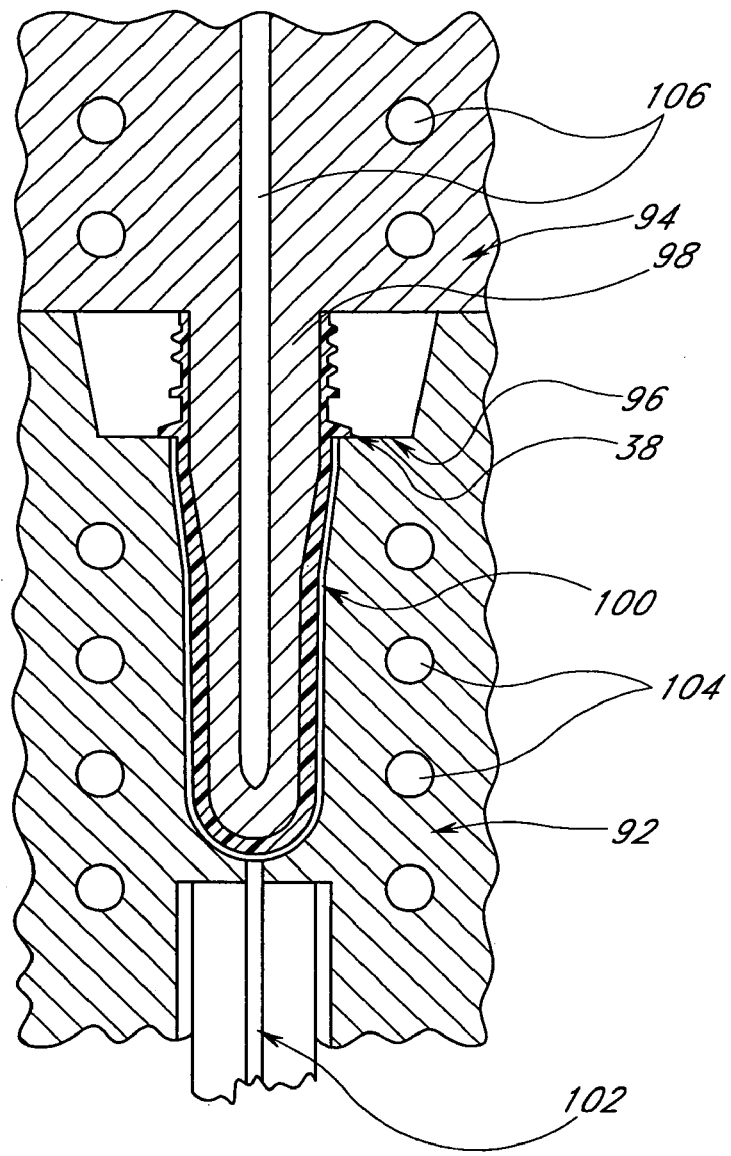
FIG. 7 is a cross-section of an injection mold of a type that may be used to make a preferred barrier-coated preform.

FIG. 7 illustrates a preferred type of mold for use in methods which utilize overmolding. The mold comprises two halves, a cavity half 92 and a mandrel half 94. The cavity half 92 comprises a cavity in which an uncoated preform is placed. The preform is held in place between the mandrel half 94, which exerts pressure on the top of the preform and the ledge 96 of the cavity half 92 on which the support ring 38 rests. The neck portion 32 of the preform is thus sealed off from the body portion of the preform. Inside the preform is the mandrel 98. As the preform sits in the mold, the body portion of the preform is completely surrounded by a void space 100. The preform, thus positioned, acts as an interior die mandrel in the subsequent injection procedure, in which the melt of the overmolding material is injected through the gate 102 into the void space 100 to form the coating. The melt, as well as the uncoated preform, is cooled by fluid circulating within channels 104 and 106 in the two halves of the mold. Preferably the circulation in channels 104 is completely separate from the circulation in the channels 106.

Figure 8:
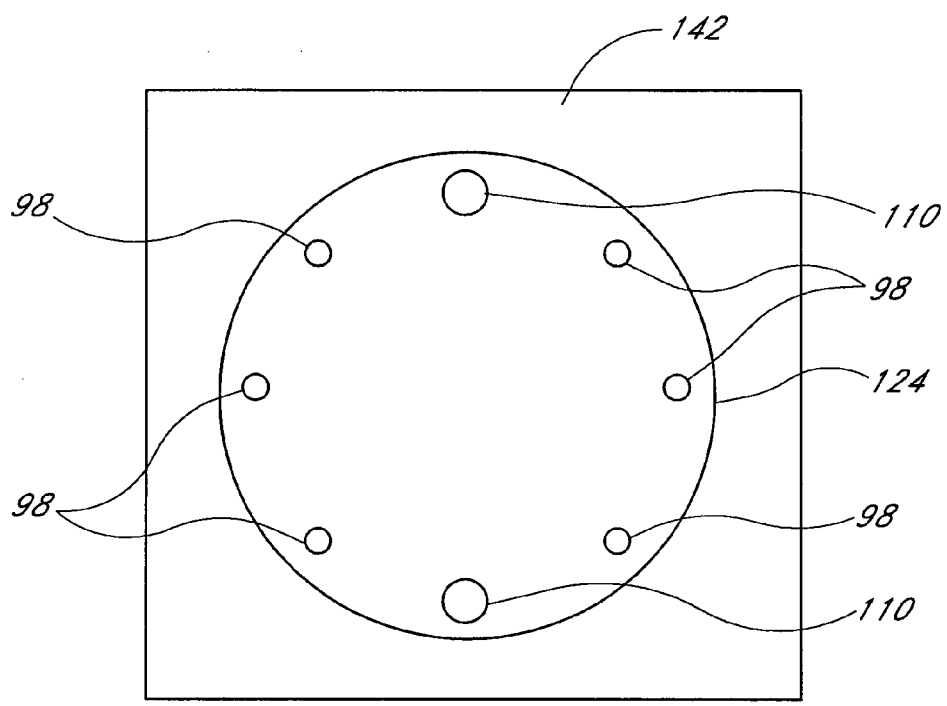
FIGS. 8 and 9 are two halves of a molding machine to make barrier-coated preforms.
Figure 9:
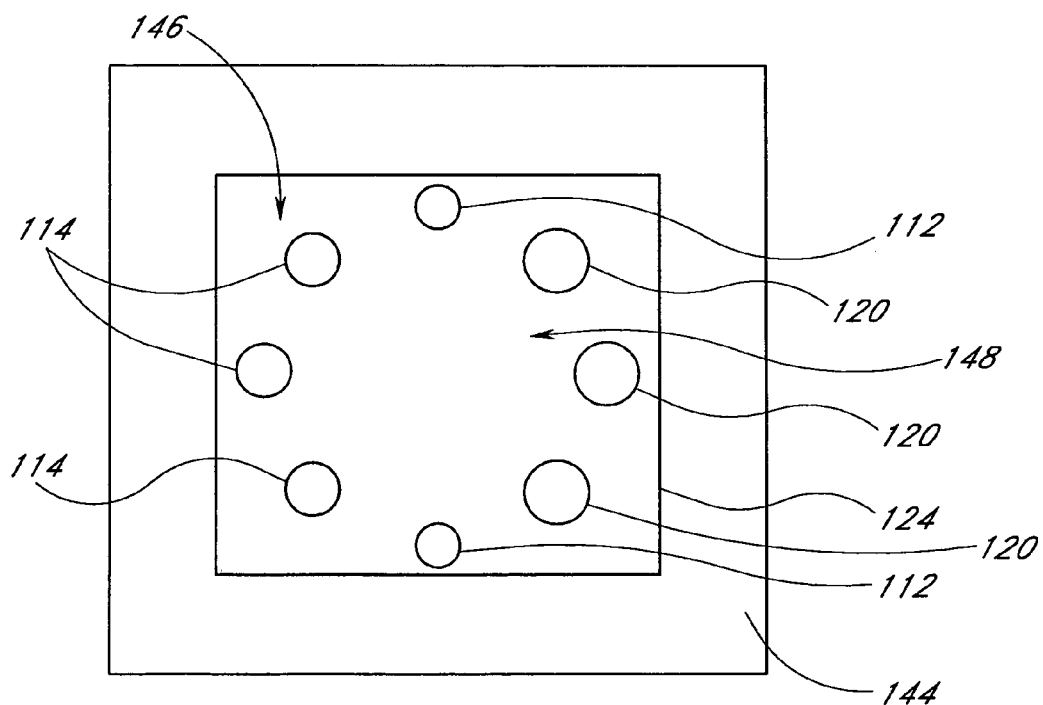

FIGS. 8 and 9 are a schematic of a portion of the preferred type of apparatus to make coated preforms in accordance with a preferred embodiment. The apparatus is an injection molding system designed to make one or more uncoated preforms and subsequently coat the newly-made preforms by over-injection of a barrier material. FIGS. 8 and 9 illustrate the two halves of the mold portion of the apparatus which will be in opposition in the molding machine. The alignment pegs 110 in FIG. 8 fit into their corresponding receptacles 112 in the other half of the mold.

The mold half depicted in FIG. 9 has several pairs of mold cavities, each cavity being similar to the mold cavity depicted in FIG. 7. The mold cavities are of two types: first injection preform molding cavities 114 and second injection preform coating cavities 120. The two types of cavities are equal in number and are preferably arranged so that all cavities of one type are on the same side of the injection block 124 as bisected by the line between the alignment peg receptacles 112. This way, every preform molding cavity 114 is 180° away from a preform coating cavity 120.

The mold half depicted in FIG. 8 has several mandrels 98, one for each mold cavity (114 and 120). When the two halves which are FIGS. 8 and 9 are put together, a mandrel 98 fits inside each cavity and serves as the mold for the interior of the preform for the preform molding cavities 114 and as a centering device for the uncoated preforms in preform coating cavities 120. The mandrels 98 are mounted on a turntable 130 which rotates 180° about its center so that a mandrel 98 originally aligned with a preform molding cavity 114 will, after rotation, be aligned with a preform coating cavity 120, and vice-versa. As described in greater detail below, this type of setup allows a preform to be molded and then coated in a two-step process using the same piece of equipment.

It should be noted that the drawings in FIGS. 8 and 9 are merely illustrative. For instance, the drawings depict an apparatus having three molding cavities 114 and three coating cavities 120 (a 3/3 cavity machine). However, the machines may have any number of cavities, as long as there are equal numbers of molding and coating cavities, for example 12/12, 24/24, 48/48 and the like. The cavities may be arranged in any suitable manner. These and other minor alterations are contemplated as part of this disclosure.

Figure 10:
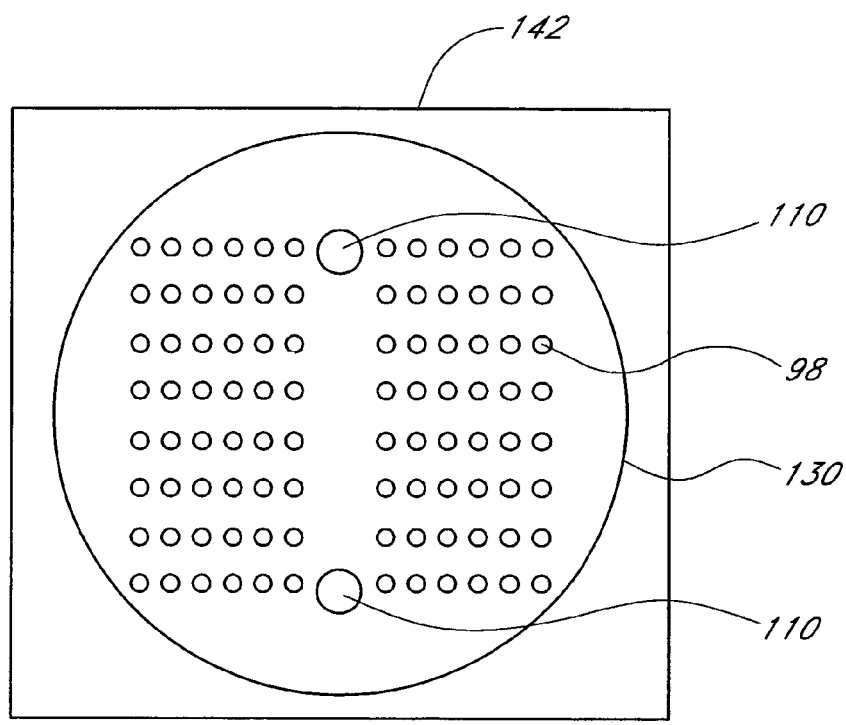
FIGS. 10 and 11 are two halves of a molding machine to make forty-eight two-layer preforms.
Figure 11:
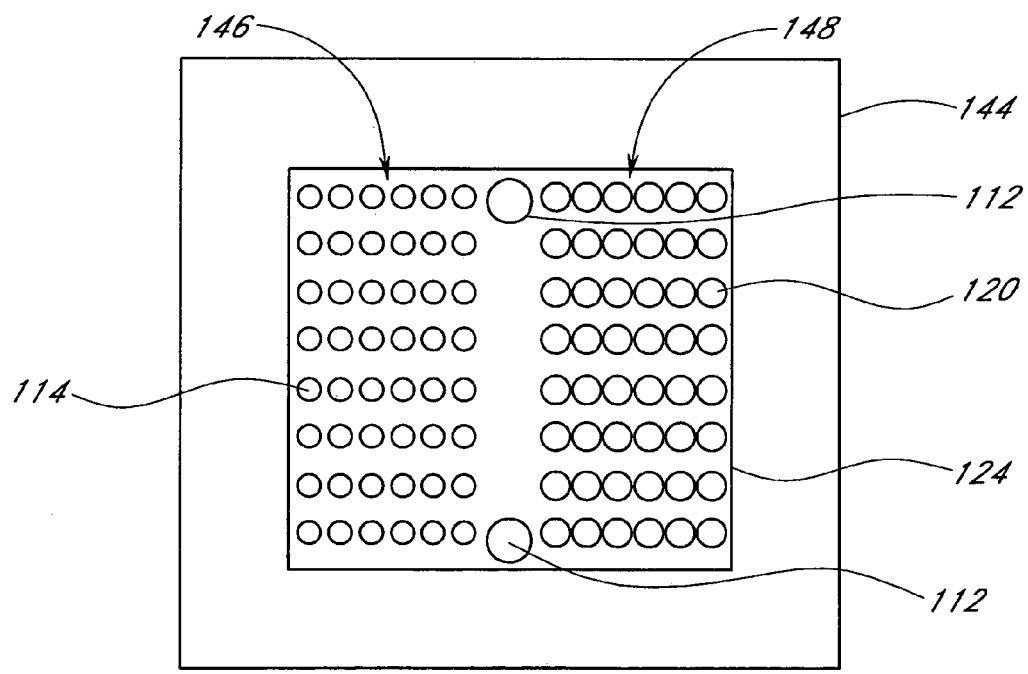

The two mold halves depicted in FIGS. 10 and 11 illustrate an embodiment of a mold of a 48/48 cavity machine as discussed for FIGS. 8 and 9. Referring to FIG. 12 there is shown a perspective view of a mold of the type for an overmolding (inject-over-inject) process in which the mandrels 98 are partially located within the cavities 114 and 120. The arrow shows the movement of the movable mold half 142, on which the mandrels 98 lie, as the mold closes.

FIG. 13 shows a perspective view of a mold of the type used in an overmolding process, wherein the mandrels 98 are fully withdrawn from the cavities 114 and 120. The arrow indicates that the turntable 130 rotates 180° to move the mandrels 98 from one cavity to the next. On the stationary half 144, the cooling for the preform molding cavity 114 is separate from the cooling for the preform coating cavity 120. Both of these are separate from the cooling for the mandrels 98 in the movable half.

Figure 14:
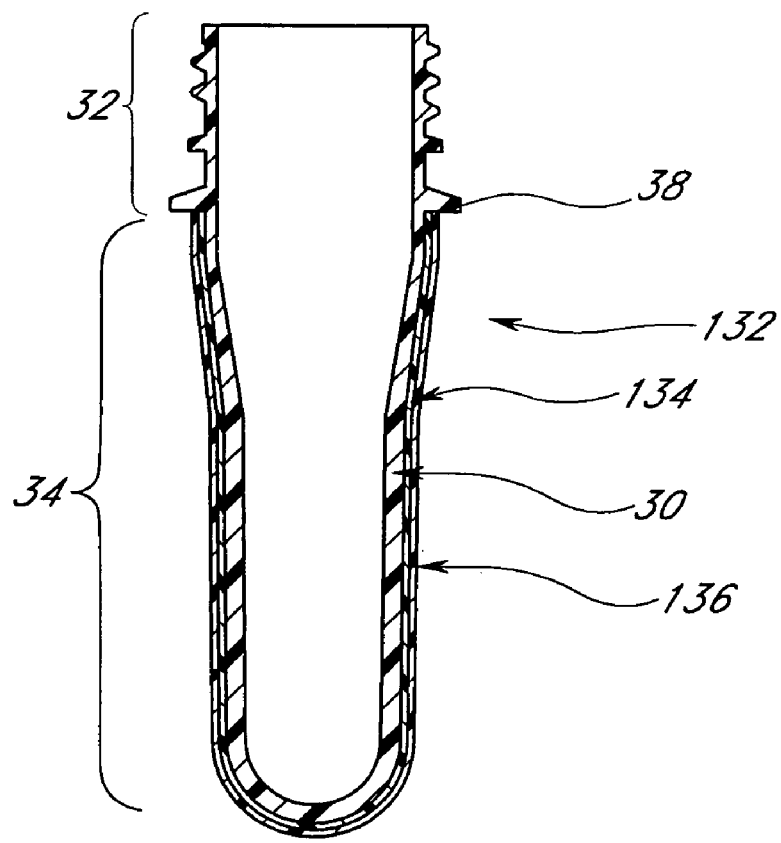
FIG. 14 is a three-layer embodiment of a preform.

Referring to FIG. 14 there is shown a preferred three-layer preform 132. This embodiment of coated preform is preferably made by placing two coating layers 134 and 136 on a preform 30 such as that shown in FIG. 1.

Figure 15:
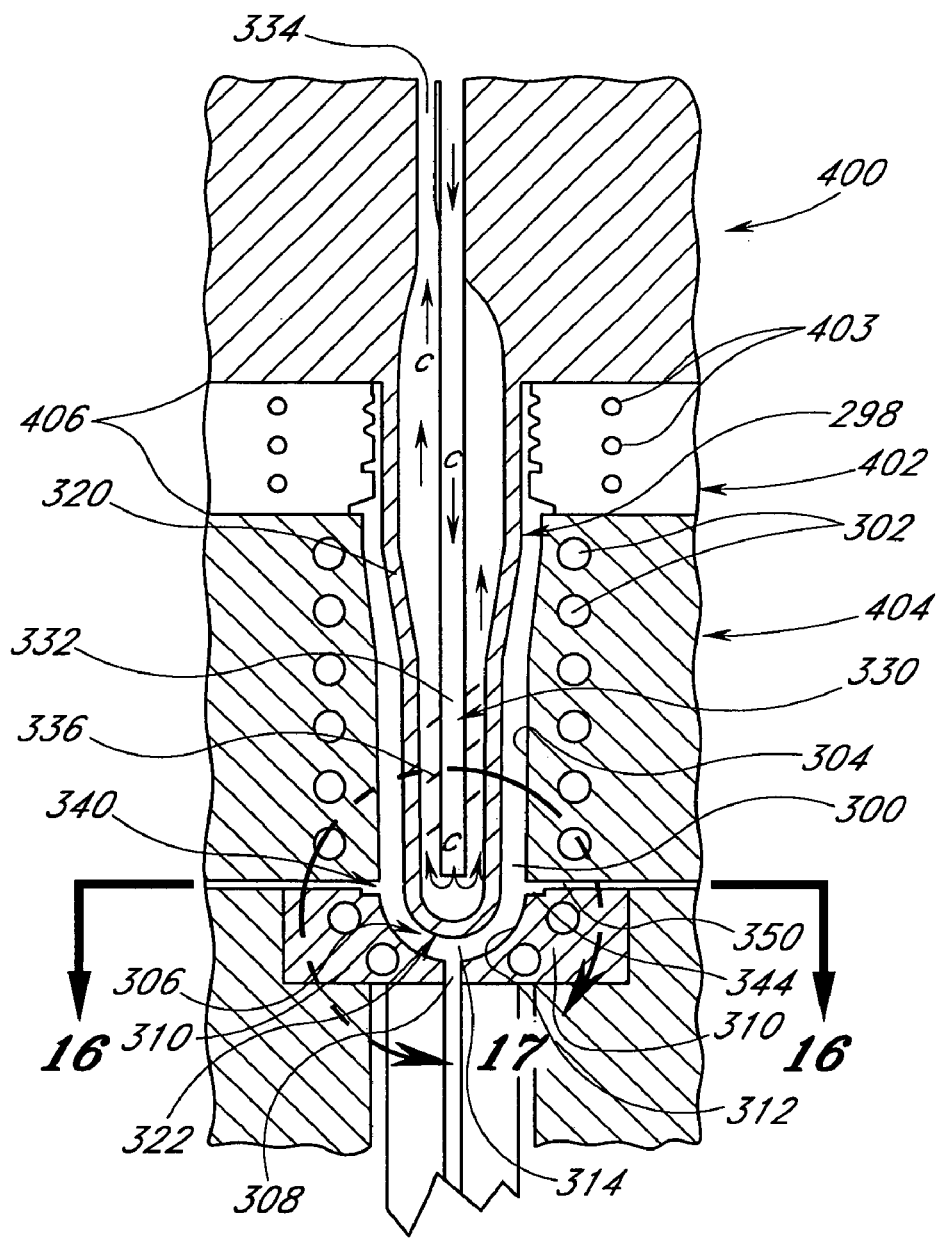
FIG. 15 is a cross-section of an injection mold of a type that may be used to make a preferred preform of the present invention.

With next reference to FIG. 15, a preferred embodiment of a mold core 298 and associated cavity 300 are shown. Cooling tubes 302 are formed in a spiral fashion just below the surface 304 of the mold cavity 300. A gate area 306 of the cavity 300 is defined near a gate 308 and an insert 310 of a material with especially high heat transfer properties is disposed in the cavity at the gate area 306. Thus, the injected preform's gate area/base end 314 is cooled especially quickly.

The core 298 is hollow and has a wall 320 of generally uniform thickness. A bubbler cooling arrangement 330 is disposed within the hollow core 298 and comprises a core tube 332 located centrally within the core 298 which delivers chilled coolant C directly to a base end 322 of the core 298. Coolant C works its way up the mandrel from the base end 322 and exits through an output line 334. The core tube is held in place by ribs 336 extending between the tube and the mandrel wall 320.

The body mold 404 has several cooling tubes 302 through which a chilled fluid, preferably water, is circulated. The neck finish mold 402 has several tubes 403 in which a fluid circulates. The fluid and circulation of tubes 403 and cooling tubes 302 are separate and independent. The coolant C circulating through the core section 400 is also separate from both tubes 403 and cooling tubes 302. However, a single coolant source may provide the coolant C for both core section 400 and cooling tubes 302 within the body portion 404 of the mold.

The thermal isolation of the body mold 404, neck finish mold 402 and core section 400 is achieved by use of inserts 406 having low thermal conductivity. However, materials having low thermal conductivity should not be used on the molding surfaces which contact the preform. Examples of preferred low thermal conductivity materials include heat-treated tool steel (e.g. P-20, H-13, Stainless etc.), polymeric inserts of filled polyamides, nomex, air gaps and minimum contact shut-off surfaces.

In this independent fluid circuit through tubes 403, the fluid would be warmer than that used in the portions of the mold used to form non-crystalline portions of the preform. Preferred fluids include water, silicones, and oils. In another embodiment, the portions of the mold which forms the crystalline portions of the preform, (corresponding to neck finish mold 402) contains a heating apparatus placed in the neck, neck finish, and/or neck cylinder portions of the mold so as to maintain the higher temperature (slower cooling) needed to promote crystallinity of the material during cooling. Such a heating apparatus includes but is not limited to heating coils, heating probes, and electric heaters, Referring also to FIGS. 16 and 17, an air insertion system 340 is shown formed at a joint 342 between members of the mold cavity 300. A notch 344 is formed circumferentially around the cavity 300. The notch 344 is sufficiently small that substantially no molten plastic will enter during melt injection. An air line 350 connects the notch 344 to a source of air pressure and a valve regulates the supply of air to the notch 344. During melt injection, the valve is closed. When injection is complete, the valve is opened and pressurized air A (FIG. 16) is supplied to the notch 344 in order to defeat a vacuum that may form between an injected preform and the cavity wall 304. Additionally, similar air insertion systems 340 may be utilized in other portions of the mold, such as the thread area, for example but without limitation.

The preferred method and apparatus for making barrier coated preforms is discussed in more detail below. Because the methods and apparatus are especially preferred for use in forming barrier coated bottles comprising certain preferred materials, the physical characteristics, identification, preparation and enhancement of the preferred materials is discussed prior to the preferred methods and apparatus for working with the materials.

A. Physical Characteristics of Preferred Barrier Materials

Preferred barrier materials preferably exhibit several physical characteristics which allow for the barrier coated bottles and articles according to preferred embodiments to be able to withstand processing and physical stresses in a manner similar or superior to that of uncoated PET articles, in addition to producing articles which are cosmetically appealing and have excellent barrier properties.

Adhesion is the union or sticking together of two surfaces. The actual interfacial adhesion is a phenomenon which occurs at the microscopic level. It is based upon molecular interactions and depends upon chemical bonding, van der Waals forces and other intermolecular attractive forces at the molecular level.

Good adhesion between the barrier layer and the PET layer is especially important when the article is a barrier bottle made by blow-molding a preform. If the materials adhere well, then they will act as one unit when they are subjected to a blow molding process and as they are subjected to stresses when existing in the form of a container. Where the adhesion is poor, delamination results either over time or under physical stress such as squeezing the container or the container jostling during shipment. Delamination is not only unattractive from a commercial standpoint, it may be evidence of a lack of structural integrity of the container. Furthermore, good adhesion means that the layers will stay in close contact when the container is expanded during the molding process and will move as one unit. When the two materials act in such a manner, it is less likely that there will be voids in the coating, thus allowing a thinner coating to be applied. The barrier materials preferably adhere sufficiently to PET such that the barrier layer cannot be easily pulled apart from the PET layer at 22° C.

The glass transition temperature (Tg) is defined as the temperature at which a non-crystallizable polymer undergoes the transformation from a soft rubber state to a hard elastic polymer glass. In a range of temperatures above its Tg, a material will become soft enough to allow it to flow readily when subjected to an external force or pressure, yet not so soft that its viscosity is so low that it acts more like a liquid than a pliable solid. The temperature range above Tg is the preferred temperature range for performing a blow-molding process, as the material is soft enough to flow under the force of the air blown into the preform to fit the mold but not so soft that it breaks up or becomes uneven in texture. Thus, when materials have similar glass transition temperatures, they will have similar preferred blowing temperature ranges, allowing the materials to be processed together without compromising the performance of either material.

In the blow-molding process to produce bottle from a preform, as is known in the art, the preform is heated to a temperature slightly above the Tg of the preform material so that when air is forced into the preform's interior, it will be able to flow to fill the mold in which it is placed. If one does not sufficiently heat the preform and uses a temperature below the Tg, the preform material will be too hard to flow properly, and would likely crack, craze, or not expand to fill the mold. Conversely, if one heats the preform to a temperature well above the Tg, the material would likely become so soft that it would not be able to hold its shape and would process improperly.

If a barrier coating material has a Tg similar to that of PET, it will have a blowing temperature range similar to PET. Thus, if a PET preform is coated with such a barrier material, a blowing temperature can be chosen that allows both materials to be processed within their preferred blowing temperature ranges. If the barrier coating were to have a Tg dissimilar to that of PET, it would be difficult, if not impossible, to choose a blowing temperature suitable for both materials. When the barrier coating materials have a Tg similar to PET, the coated preform behaves during blow molding as if it were made of one material, expanding smoothly and creating a cosmetically appealing container with an even thickness and uniform coating of the barrier material where it is applied.

The glass transition temperature of PET occurs in a window of about 75-85° C., depending upon how the PET has been processed previously. The Tg for preferred barrier materials is preferably 55 to 140° C., more preferably 90 to 110° C.

Another factor which has an impact on the performance of barrier preforms during blow molding is the state of the material. The preferred barrier materials of preferred embodiments are amorphous rather than crystalline. This is because materials in an amorphous state are easier to form into bottles and containers by use of a blow molding process than materials in a crystalline state. PET can exist in both crystalline and amorphous forms. However, in preferred embodiments it is highly preferred that the crystallinity of the PET be minimized and the amorphous state maximized in order to create a semi-crystalline state which, among other things, aids interlayer adhesion and in the blow molding process. A PET article formed from a melt of PET, as in injection molding, can be guided into a semi-crystalline form by cooling the melt at a high rate, fast enough to quench the crystallization process, freezing the PET in a mostly amorphous state. Additionally, use of "high IPA PET" as described earlier herein will allow easier quenching of the crystallization process because it crystallizes at a lower rate than homopolymer PET.

Intrinsic viscosity and melt index are two properties which are related to a polymer's molecular weight. These properties give an indication as to how materials will act under various processing conditions, such as injection molding and blow molding processes.

Barrier materials for use in the articles and methods according to preferred embodiments have an intrinsic viscosity of preferably 0.70-0.90 dl/g, more preferably 0.74-0.87 dl/g, most preferably 0.84-0.85 dl/g and a melt index of preferably 5-30, more preferably 7-12, most preferably 10.

Barrier materials preferably have tensile strength and creep resistance similar to PET. Similarity in these physical properties allows the barrier coating to act as more than simply a gas barrier. A barrier coating having physical properties similar to PET acts as a structural component of the container, allowing the barrier material to displace some of the polyethylene terephthalate in the container without sacrificing container performance. Displacement of PET allows for the resulting barrier-coated containers to have physical performance and characteristics similar to their uncoated counterparts without a substantial change in weight or size. It also allows for any additional cost from adding the barrier material to be defrayed by a reduction in the cost per container attributed to PET.

Similarity in tensile strength between PET and the barrier coating materials helps the container to have structural integrity. This is especially important if some PET is displaced by barrier material. Barrier-coated bottles and containers having features in accordance with preferred embodiments are able to withstand the same physical forces as an uncoated container, allowing, for example, barrier-coated containers to be shipped and handled in the customary manner of handling uncoated PET containers. If the barrier-coating material were to have a tensile strength substantially lower than that of PET, a container having some PET displaced by barrier material would likely not be able to withstand the same forces as an uncoated container.

Similarity in creep resistance between PET and the barrier coating materials helps the container to retain its shape. Creep resistance relates to the ability of a material to resist changing its shape in response to an applied force. For example, a bottle which holds a carbonated liquid needs to be able to resist the pressure of dissolved gas pushing outward and retain its original shape. If the barrier coating material were to have a substantially lower resistance to creep than PET in a container, the resulting container would be more likely to deform over time, reducing the shelf-life of the product.

For applications where optical clarity is of importance, preferred barrier materials have an index of refraction similar to that of PET. When the refractive index of the PET and the barrier coating material are similar, the preforms and, perhaps more importantly, the containers blown therefrom are optically clear and, thus, cosmetically appealing for use as a beverage container where clarity of the bottle is frequently desired. If, however, the two materials have substantially dissimilar refractive indices when they are placed in contact with each other, the resulting combination will have visual distortions and may be cloudy or opaque, depending upon the degree of difference in the refractive indices of the materials.

Polyethylene terephthalate has an index of refraction for visible light within the range of about 1.40 to 1.75, depending upon its physical configuration. When made into preforms, the refractive index is preferably within the range of about 1.55 to 1.75, and more preferably in the range of 1.55-1.65. After the preform is made into a bottle, the wall of the final product, may be characterized as a biaxially-oriented film since it is subject to both hoop and axial stresses in the blow molding operation. Blow molded PET generally exhibits a refractive index within the range of about 1.40 to 1.75, usually about 1.55 to 1.75, depending upon the stretch ratio involved in the blow molding operation. For relatively low stretch ratios of about 6:1, the refractive index will be near the lower end, whereas for high stretch ratios, about 10:1, the refractive index will be near the upper end of the aforementioned range. It will be recognized that the stretch ratios referred to herein are biaxial stretch ratios resulting from and include the product of the hoop stretch ratio and the axial stretch ratio. For example, in a blow molding operation in which the final preform is enlarged by a factor of 2.5 in the axial direction and a factor of 3.5 diametrically, the stretch ratio will be about 8.75 (2.5×3.5).

Using the designation $n_i$ to indicate the refractive index for PET and $n_o$ to indicate the refractive index for the barrier material, the ratio between the values $n_i$ and $n_o$ is preferably 0.8-1.3, more preferably 1.0-1.2, most preferably 1.0-1.1. As will be recognized by those skilled in the art, for the ratio $n_i/n_o=1$ the distortion due to refractive index will be at a minimum, because the two indices are identical. As the ratio progressively varies from one, however, the distortion increases progressively.

B. Preferred Barrier Coating Materials and Their Preparation

The preferred barrier coating materials for use in the articles and methods described herein include Phenoxy-type Thermoplastic materials, copolyesters of terephthalic acid, isophthalic acid, and at least one diol having good barrier properties as compared to PET (Copolyester Barrier Materials), polyamides, Polyamide Blends, PEN, PEN copolymers, PEN/PET blends, and combinations thereof. Preferably, the Phenoxy-type Thermoplastics used as barrier materials are of the types discussed in U.S. Pat. Nos. 6,312,641, issued Nov. 6, 2001, and 6,391,408, issued May 21, 2002, as well as U.S. patent application Ser. No. 09/844,820, filed Apr. 27, 2001, the entireties of which are hereby expressly incorporated by reference herein. In addition, other preferred barrier materials include polyethylene naphthalate (PEN), PEN copolyester, and PET/PEN blends. PEN materials can be purchased from Shell Chemical Company.

C. Preparation of Polyesters

Polyesters and methods for their preparation (including the specific monomers employed in their formation, their proportions, polymerization temperatures, catalysts and other conditions) are well-known in the art and reference is made thereto for the purposes herein. For purposes of illustration and not limitation, reference is particularly made to pages 1-62 of Volume 12 of the Encyclopedia of Polymer Science and Engineering, 1988 revision, John Wiley & Sons.

Typically, polyesters are derived from the reaction of a di- or polycarboxylic acid with a di- or polyhydric alcohol. Suitable di- or polycarboxylic acids include polycarboxylic acids and the esters and anhydrides of such acids, and mixture thereof. Representative carboxylic acids include phthalic, isophthalic, adipic azelaic, terephthalic, oxalic, malonic, succinic, glutaric, sebacic, and the like. Dicarboxylic components are preferred. Terephthalic acid is most commonly employed and preferred in the preparation of polyester films. $\alpha,\beta$-Unsaturated di- and polycarboxylic acids (including esters or anhydrides of such acids and mixtures thereof) can be used as partial replacement for the saturated carboxylic components. Representative $\alpha,\beta$-unsaturated di- and polycarboxylic acids include maleic, fumaric, aconitic, itaconic, mesaconic, citraconic, monochloromaleic and the like.

Typical di- and polyhydric alcohols used to prepare the polyester are those alcohols having at least two hydroxy groups, although minor amounts of alcohol having more or less hydroxy groups may be used. Dihydroxy alcohols are preferred. Dihydroxy alcohols conventionally employed in the preparation of polyesters include diethylene glycol; dipropylene glycol; ethylene glycol; 1,2-propylene glycol; 1,4-butanediol; 1,4-pentanediol; 1,5-hexanediol, 1,4-cyclohexanedimethanol and the like with 1,2-propylene glycol being preferred. Mixtures of the alcohols can also be employed. The di- or polyhydric alcohol component of the polyester is usually stoichiometric or in slight excess with respect to the acid. The excess of the di- or polyhydric alcohol will seldom exceed about 20 to 25 mole percent and usually is between about 2 and about 10 mole percent.

The polyester is generally prepared by heating a mixture of the di- or polyhydric alcohol and the di- or polycarboxylic component in their proper molar ratios at elevated temperatures, usually between about 100° C. and 250° C. for extended periods of time, generally ranging from 5 to 15 hours. Polymerization inhibitors such as t-butylcatechol may advantageously be used.

PET, the preferred polyester, which is commonly made by condensation of terephthalic acid and ethylene glycol, may be purchased from Dow Chemical Company (Midland, Mich.), and Allied Signal Inc. (Baton Rouge, La.), among many others.

Preferably, the PET used is that in which isophthalic acid (IPA) is added during the manufacture of the PET to form a copolymer. The amount of IPA added is preferably 2-10% by weight, more preferably 3-8% by weight, most preferably 4-5% by weight. The most preferred range is based upon current FDA regulations which currently do not allow for PET materials having an IPA content of more than 5% to be in contact with food or drink. High-IPA PET (PET having more than about 2% IPA by weight) can be made as discussed above, or purchased from a number of different manufacturers, for instance PET with 4.8% IPA may be purchased from SKF (Italy) and 10% IPA PET may be purchased from INCA (Dow Europe).

Additionally, if a barrier material containing polyamide is chosen, it is preferred to use the Polyamide Blends.

D. Other Materials to Enhance Barrier Properties

The materials noted herein, including base materials, such as PET, barrier materials such as Phenoxy-type Thermoplastics, polyamides and Polyamide Blends, and other materials such as recycled PET may be used in combination with other materials which enhance or provide the barrier properties. Generally speaking, one cause for the diffusion of gases through a material is the existence of gaps or holes in the material at the molecular level through which the gas molecules can pass. The presence of intermolecular forces in a material, such as hydrogen bonding, allows for interchain cohesion in the matrix which closes these gaps and discourages diffusion of gases. One may also increase the gas-barrier ability of good barrier materials by adding an additional molecule or substance which takes advantage of such intermolecular forces and acts as a bridge between polymer chains in the matrix, thus helping to close the holes in the matrix and reduce gas diffusion.

Derivatives of the diol resorcinol (m-dihydroxybenzene), when reacted with other monomers in the manufacture of PHAE, PET, Copolyester Barrier Materials, and other barrier materials, will generally result in a material which has better barrier properties than the same material if it does not contain the resorcinol derivative. For example, resorcinol diglycidyl ether can be used in PHAE and hydroxyethyl ether resorcinol can be used in PET and other polyesters and Copolyester Barrier Materials.

One measure of the efficacy of a barrier is the effect that it has upon the shelf life of the material. The shelf life of a carbonated soft drink in a 32 oz PET non-barrier bottle is approximately 12-16 weeks. Shelf life is determined as the time at which less than 85% of the original amount of carbon dioxide is remaining in the bottle. Bottles coated with PHAE using the inject-over-inject method described below have been found to have a shelf life 2 to 3 times greater than that of PET alone. If, however, PHAE with resorcinol diglycidyl ether is used, the shelf life can be increased to 4 to 5 times that of PET alone.

Another way of enhancing the barrier properties of a material is to add a substance which "plugs" the holes in the polymer matrix and thus discourages gases from passing through the matrix. Alternatively, a substance may aid in creating a more tortuous path for gas molecules to take as they permeate a material. One such substance, referred to herein by the term "Nanoparticles" or "nanoparticular material" are tiny particles of materials which enhance the barrier properties of a material by creating a more tortuous path for migrating oxygen or carbon dioxide. One preferred type of nanoparticular material is a microparticular clay-based product available from Southern Clay Products.

Another way to provide or enhance barrier properties is to include an oxygen scavenger. Oxygen scavengers may be blended with a material by physical blending or mixing of the oxygen scavenger with pellets or flakes of a polymer or by compounding the oxygen scavenger with the polymer. Preferred oxygen scavengers include Amosorb 3000 from Amoco. Preferably, the oxygen scavenger is added at a level of 0.5 to 15% by weight, more preferably 1 to 10% by weight, including 5%, 7% and 9%. Other scavengers may be added at volumes which achieve the desired degree of effect, or at levels at or below which they have been approved for use in connection with packaging such as for foods.

E. Preparing Barrier-Coated Articles

Once a suitable barrier coating material is chosen, the coated preform must be made in a manner that promotes adhesion between the two materials. Generally, adherence between the barrier coating materials and PET increases as the surface temperature of the PET increases. Therefore, it is preferable to perform coating on heated preforms, although the preferred barrier materials will adhere to PET at room temperature. Although this discussion is in terms of barrier materials, the same principles noted herein apply to the coating or overmolding of RPET and PET and other such combinations of materials.

There are a number of methods of producing a coated PET preform in accordance with the preferred embodiments. Preferred methods include dip coating, spray coating, flame spraying fluidized bed dipping, and electrostatic powder spraying. Each of the above methods is described in U.S. Pat. No. 6,391,408 entitled BARRIER-COATED POLYESTER, which is hereby incorporated by reference in its entirety.

An especially preferred method of producing a coated PET preform is referred to herein generally as overmolding, and sometimes as inject-over-inject ("IOI"). The name refers to a procedure which uses injection molding to inject one or more layers of barrier material over an existing preform, which preferably was itself made by injection molding. The terms "overinjecting" and "overmolding" are used herein to describe the coating process whereby a layer of material, preferably comprising barrier material, is injected over an existing preform. In an especially preferred embodiment, the overinjecting process is performed while the underlying preform has not yet fully cooled. Overinjecting may be used to place one or more additional layers of materials such as those comprising barrier material, recycled PET, or other materials over a coated or uncoated preform. The IOI process is described in the application noted above as well as copending U.S. Pat. No. 6,352,426 entitled APPARATUS AND METHOD FOR MAKING BARRIER-COATED POLYESTER, which is hereby incorporated by reference in its entirety. This application also incorporates by reference in their entirety abandoned U.S. application Ser. No. 09/844,820, filed on Apr. 27, 2001, and U.S. application Ser. No. 09/949,413, filed on Sep. 5, 2001.

1. Preferred Overmolding (Inject-over-Inject) Processes

The overmolding is preferably carried out by using an injection molding process using equipment similar to that used to form the uncoated preform itself. A preferred mold for overmolding, with an uncoated preform in place is shown in FIG. 7. The mold comprises two halves, a cavity half 92 and a mandrel half 94, and is shown in FIG. 7 in the closed position prior to overinjecting. The cavity half 92 comprises a cavity in which the uncoated preform is placed. The support ring 38 of the preform rests on a ledge 96 and is held in place by the mandrel half 94, which exerts pressure on the support ring 38, thus sealing the neck portion off from the body portion of the preform. The cavity half 92 has a plurality of tubes or channels 104 therein which carry a fluid. Preferably the fluid in the channels circulates in a path in which the fluid passes into an input in the cavity half 92, through the channels 104, out of the cavity half 92 through an output, through a chiller or other cooling device, and then back into the input. The circulating fluid serves to cool the mold, which in turn cools the plastic melt which is injected into the mold to form the coated preform.

The mandrel half 94 of the mold comprises a mandrel 98. The mandrel 98, sometimes called a core, protrudes from the mandrel half 94 of the mold and occupies the central cavity of the preform. In addition to helping to center the preform in the mold, the mandrel 98 cools the interior of the preform. The cooling is done by fluid circulating through channels 106 in the mandrel half 94 of the mold, most importantly through the length of the mandrel 98 itself. The channels 106 of the mandrel half 94 work in a manner similar to the channels 104 in the cavity half 92, in that they create the portion of the path through which the cooling fluid travels which lies in the interior of the mold half.

As the preform sits in the mold cavity, the body portion of the preform is centered within the cavity and is completely surrounded by a void space 100. The preform, thus positioned, acts as an interior die mandrel in the subsequent injection procedure. The melt of the overmolding material, preferably comprising a barrier material, is then introduced into the mold cavity from the injector via gate 102 and flows around the preform, preferably surrounding at least the body portion 34 of the preform. Following overinjection, the overmolded layer will take the approximate size and shape of the void space 100.

To carry out the overmolding procedure, one preferably heats the initial preform which is to be coated preferably to a temperature above its Tg. In the case of PET, that temperature is preferably about 60 to 175° C., more preferably about 80-110° C. If a temperature at or above the minimum temperature of crystallization for PET is used, which is about 120° C., care should be taken when cooling the PET in the preform. The cooling should be sufficient to minimize crystallization of the PET in the preform so that the PET is in the preferred semi-crystalline state. Advantageously, the neck portion of the preform is not in contact with the melt of overmolding material, and thus retains its crystalline structure. Alternatively, the initial preform used may be one which has been very recently injection molded and not fully cooled, as to be at an elevated temperature as is preferred for the overmolding process.

The coating material is heated to form a melt of a viscosity compatible with use in an injection molding apparatus. The temperature for this, the inject temperature, will differ among materials, as melting ranges in polymers and viscosities of melts may vary due to the history, chemical character, molecular weight, degree of branching and other characteristics of a material. For the preferred barrier materials disclosed above, the inject temperature is preferably in the range of about 160-325° C., more preferably 200 to 275° C. For example, for the Copolyester Barrier Material B-010, the preferred temperature is around 210° C., whereas for the PHAE XU-19040.00L, BLOX 0005 or BLOX 0003 the preferred temperature is in the range of 160-260° C., and is more preferably about 175-240° C. Most preferably, the PHAE inject temperature is about 175-200° C. If recycled PET is used, the inject temperature is preferably 250-320° C. The coating material is then injected into the mold in a volume sufficient to fill the void space 100. If the coating material comprises barrier material, the coating layer is a barrier layer.

The coated preform is preferably cooled at least to the point where it can be displaced from the mold or handled without being damaged, and removed from the mold where further cooling may take place. If PET is used, and the preform has been heated to a temperature near or above the temperature of crystallization for PET, the cooling should be fairly rapid and sufficient to ensure that the PET is primarily in the semi-crystalline state when the preform is fully cooled. As a result of this process, a strong and effective bonding takes place between the initial preform and the subsequently applied coating material.

Overmolding can be also used to create coated preforms with three or more layers. In FIG. 14, there is shown a three-layer embodiment of a preform 132 in accordance with one preferred embodiment. The preform shown therein has two coating layers, a middle layer 134 and an outer layer 136. The relative thickness of the layers shown in FIG. 16 may be varied to suit a particular combination of layer materials or to allow for the making of different sized bottles. As will be understood by one skilled in the art, a procedure analogous to that disclosed above would be followed, except that the initial preform would be one which had already been coated, as by one of the methods for making coated preforms described herein, including overmolding.

a. A Preferred Method and Apparatus for Overmolding

A preferred apparatus for performing the overmolding process is based upon the use of a 330-330-200 machine by Engel (Austria). The preferred mold portion the machine is shown schematically in FIGS. 8-13 and comprises a movable half 142 and a stationary half 144. In one preferred embodiment, both halves are preferably made from hard metal. The stationary half 144 comprises at least two mold sections 146, 148, wherein each mold section comprises N(N>0) identical mold cavities 114, 120, an input and output for cooling fluid, channels allowing for circulation of cooling fluid within the mold section, injection apparatus, and hot runners channeling the molten material from the injection apparatus to the gate of each mold cavity. Because each mold section forms a distinct preform layer, and each preform layer is preferably made of a different material, each mold section is separately controlled to accommodate the potentially different conditions required for each material and layer. The injector associated with a particular mold section injects a molten material, at a temperature suitable for that particular material, through that mold section's hot runners and gates and into the mold cavities. The mold section's own input and output for cooling fluid allow for changing the temperature of the mold section to accommodate the characteristics of the particular material injected into a mold section. Consequently, each mold section may have a different injection temperature, mold temperature, pressure, injection volume, cooling fluid temperature, etc. to accommodate the material and operational requirements of a particular preform layer.

The movable half 142 of the mold comprises a turntable 130 and a plurality of cores or mandrels 98. The alignment pins guide the movable half 142 to slidably move in a preferably horizontal direction towards or away from the stationary half 144. The turntable 130 may rotate in either a clockwise or counterclockwise direction, and is mounted onto the movable half 142. The plurality of mandrels 98 are affixed onto the turntable 130. These mandrels 98 serve as the mold form for the interior of the preform, as well as serving as a carrier and cooling device for the preform during the molding operation. The cooling system in the mandrels is separate from the cooling system in the mold sections.

The mold temperature or cooling for the mold is controlled by circulating fluid. There is separate cooling fluid circulation for the movable half 142 and for the overmolding section 148 of the stationary half 144. Additionally, the initial preform mold section 146 of the stationary half 144 comprises two separate cooling fluid circulation systems; one for the non-crystalline regions and one for the crystalline regions. Each cooling fluid circulation set up works in a similar manner. The fluid enters the mold, flows through a network of channels or tubes inside as discussed above for FIG. 7, and then exits through an output. From the output, the fluid travels through a pump, which keeps the fluid flowing, and a chilling system to keep the fluid within the desired temperature range, before going back into the mold.

In a preferred embodiment, the mandrels/cores and cavities are constructed of a high heat transfer material, such a beryllium, which is coated with a hard metal, such as tin or chrome. The hard coating keeps the beryllium from direct contact with the preform, as well as acting as a release for ejection and providing a hard surface for long life. The high heat transfer material allows for more efficient cooling, and thus assists in achieving lower cycle times. The high heat transfer material may be disposed over the entire area of each mandrel and/or cavity, or it may be only on portions thereof. Preferably, at least the tips of the mandrels comprise high heat transfer material. Another, even more preferred high heat transfer material is AMPCOLOY, which is commercially available from Uudenholm, Inc.

The number of mandrels is equal to the total number of cavities, and the arrangement of the mandrels 98 on the movable half 142 mirrors the arrangement of the cavities 114, 120 on the stationary half 144. To close the mold, the movable half 142 moves towards the stationary half 144, mating the mandrels 98 with the cavities 114, 120. To open the mold, the movable half 142 moves away from the stationary half 144 such that the mandrels 98 are well clear of the block on the stationary half 144. After the mandrels 98 are fully withdrawn 98 from the mold sections 146, 148, the turntable 130 of the movable half 142 rotates the mandrels 98 into alignment with a different mold section. Thus, the movable half rotates 360°/(number of mold sections in the stationary half) degrees after each withdrawal of the mandrels from the stationary half. When the machine is in operation, during the withdrawal and rotation steps, there will be preforms present on some or all of the mandrels.

The size of the cavities in a given mold section 146, 148 will be identical; however the size of the cavities will differ among the mold sections. The cavities in which the uncoated preforms are first molded, the preform molding cavities 114, are smallest in size. The size of the cavities 120 in the mold section 148 in which the first coating step is performed are larger than the preform molding cavities 114, in order to accommodate the uncoated preform and still provide space for the coating material to be injected to form the overmolded coating. The cavities in each subsequent mold section wherein additional overmolding steps are performed will be increasingly larger in size to accommodate the preform as it gets larger with each coating step.

After a set of preforms has been molded and overmolded to completion, a series of ejectors eject the finished preforms off of the mandrels 98. The ejectors for the mandrels operate independently, or at least there is a single ejector for a set of mandrels equal in number and configuration to a single mold section, so that only the completed preforms are ejected. Uncoated or incompletely-coated preforms remain on the mandrels so that they may continue in the cycle to the next mold section. The ejection may cause the preforms to completely separate from the mandrels and fall into a bin or onto a conveyor. Alternatively, the preforms may remain on the mandrels after ejection, after which a robotic arm or other such apparatus grasps a preform or group of preforms for removal to a bin, conveyor, or other desired location.

FIGS. 8 and 9 illustrate a schematic for an embodiment of the apparatus described above. FIG. 9 is the stationary half 144 of the mold. In this embodiment, the block 124 has two mold sections, one section 146 comprising a set of three preform molding cavities 114 and the other section 148 comprising a set of three preform coating cavities 120. Each of the preform coating cavities 120 is preferably like that shown in FIG. 7, discussed above. Each of the preform molding cavities 114 is preferably similar to that shown in FIG. 15, in that the material is injected into a space defined by the mandrel 98 (albeit without a preform already thereon) and the wall of the mold which is cooled by fluid circulating through channels inside the mold block. Consequently, one full production cycle of this apparatus will yield three two-layer preforms. If more than three preforms per cycle is desired, the stationary half can be reconfigured to accommodate more cavities in each of the mold sections. An example of this is seen in FIG. 11, wherein there is shown a stationary half of a mold comprising two mold sections, one 146 comprising forty-eight preform molding cavities 114 and the other 148 comprising forty-eight preform coating cavities 120. If a three or more layer preform is desired, the stationary half 144 can be reconfigured to accommodate additional mold sections, one for each preform layer FIG. 8 illustrates the movable half 142 of the mold. The movable half comprises six identical mandrels 98 mounted on the turntable 130. Each mandrel 98 corresponds to a cavity on the stationary half 144 of the mold. The movable half also comprises alignment pegs 110, which correspond to the receptacles 112 on the stationary half 144. When the movable half 142 of the mold moves to close the mold, the alignment pegs 110 are mated with their corresponding receptacles 112 such that the molding cavities 114 and the coating cavities 120 align with the mandrels 98. After alignment and closure, half of the mandrels 98 are centered within preform molding cavities 114 and the other half of the mandrels 98 are centered within preform coating cavities 120.

The configuration of the cavities, mandrels, and alignment pegs and receptacles must all have sufficient symmetry such that after the mold is separated and rotated the proper number of degrees, all of the mandrels line up with cavities and all alignment pegs line up with receptacles. Moreover, each mandrel must be in a cavity in a different mold section than it was in prior to rotation in order to achieve the orderly process of molding and overmolding in an identical fashion for each preform made in the machine.

Two views of the two mold halves together are shown in FIGS. 12 and 13. In FIG. 12, the movable half 142 is moving towards the stationary half 144, as indicated by the arrow. Two mandrels 98, mounted on the turntable 130, are beginning to enter cavities, one enters a molding cavity 114 and the other is entering a coating cavity 120 mounted in the block 124. In FIG. 13, the mandrels 98 are fully withdrawn from the cavities on the stationary side. The preform molding cavity 114 has two cooling circulation systems which are separate from the cooling circulation for the preform coating cavity 120, which comprises the other mold section 148. The two mandrels 98 are cooled by a single system that links all the mandrels together. The arrow in FIG. 13 shows the rotation of the turntable 130. The turntable 130 could also rotate clockwise. Not shown are coated and uncoated preforms which would be on the mandrels if the machine were in operation. The alignment pegs and receptacles have also been left out for the sake of clarity.

The operation of the overmolding apparatus will be discussed in terms of the preferred two mold section apparatus for making a two-layer preform. The mold is closed by moving the movable half 142 towards the stationary half 144 until they are in contact. A first injection apparatus injects a melt of first material into the first mold section 146, through the hot runners and into the preform molding cavities 114 via their respective gates to form the uncoated preforms each of which become the inner layer of a coated preform. The first material fills the void between the preform molding cavities 114 and the mandrels 98. Simultaneously, a second injection apparatus injects a melt of second material into the second mold section 148 of the stationary half 144, through the hot runners and into each preform coating cavity 120 via their respective gates, such that the second material fills the void (100 in FIG. 9) between the wall of the coating cavity 120 and the uncoated preform mounted on the mandrel 98 therein.

During this entire process, cooling fluid is circulating through the four separate areas, corresponding to the non-crystalline regions of mold section 146 of the preform molding cavities 114, the crystalline regions of mold section 146 of the preform molding cavities 114, mold section 148 of the preform coating cavities 120, and the movable half 142 of the mold, respectively. Thus, the melts and preforms are being cooled in the center by the circulation in the movable half that goes through the interior of the mandrels, as well as on the outside by the circulation in each of the cavities.

The movable half 142 then slides back to separate the two mold halves and open the mold until all of the mandrels 98 having preforms thereon are completely withdrawn from the preform molding cavities 114 and preform coating cavities 120. The ejectors eject the coated, finished preforms off of the mandrels 98 which were just removed from the preform coating cavities. As discussed above, the ejection may cause the preforms to completely separate from the mandrels and fall into a bin or onto a conveyor, or if the preforms remain on the mandrels after ejection, a robotic arm or other apparatus may grasp a preform or group of preforms for removal to a bin, conveyor, or other desired location. The turntable 130 then rotates 180° so that each mandrel 98 having an uncoated preform thereon is positioned over a preform coating cavity 120, and each mandrel from which a coated preform was just ejected is positioned over a preform molding cavity 114. Rotation of the turntable 130 may occur as quickly as 0.5-0.9 seconds. Using the alignment pegs 110, the mold halves again align and close, and the first injector injects the first material into the preform molding cavity 114 while the second injector injects the barrier material into the preform coating cavity 120.

A production cycle of closing the mold, injecting the melts, opening the mold, ejecting finished barrier preforms, rotating the turntable, and closing the mold is repeated, so that preforms are continuously being molded and overmolded.

When the apparatus first begins running, during the initial cycle, no preforms are yet in the preform coating cavities 120. Therefore, the operator should either prevent the second injector from injecting the second material into the second mold section during the first injection, or allow the second material to be injected and eject and then discard the resulting single layer preform comprised solely of the second material. After this start-up step, the operator may either manually control the operations or program the desired parameters such that the process is automatically controlled.

Two layer preforms may be made using the first preferred overmolding apparatus described above. In one preferred embodiment, the two layer preform comprises an inner layer comprising polyester and an outer layer comprising barrier material. In especially preferred embodiments, the inner layer comprises virgin PET. The description hereunder is directed toward the especially preferred embodiments of two layer preforms comprising an inner layer of virgin PET, in which the neck portion is generally crystalline and the body portion is generally non-crystalline. The description is directed toward describing the formation of a single set of coated preforms 60 of the type seen in FIG. 4, that is, following a set of preforms through the process of molding, overmolding and ejection, rather than describing the operation of the apparatus as a whole. The process described is directed toward preforms having a total thickness in the wall portion 66 of about 3 mm, comprising about 2 mm of virgin PET and about 1 mm of barrier material. The thickness of the two layers will vary in other portions of the preform 60, as shown in FIG. 4.

It will be apparent to one skilled in the art that some of the parameters detailed below will differ if other embodiments of preforms are used. For example, the amount of time which the mold stays closed will vary depending upon the wall thickness of the preforms. However, given the disclosure below for this preferred embodiment and the remainder of the disclosure herein, one skilled in the art would be able to determine appropriate parameters for other preform embodiments.

The apparatus described above is set up so that the injector supplying the mold section 146 containing the preform molding cavities 114 is fed with virgin PET and that the injector supplying the mold section 148 containing the preform coating cavities 120 is fed with a barrier material.

The movable half 142 of the mold is moved so that the mold is closed. A melt of virgin PET is injected through the back of the block 124 and into each preform molding cavity 114 to form an uncoated preform 30 which becomes the inner layer of the coated preform. The injection temperature of the PET melt is preferably 250 to 320° C., more preferably 255 to 280° C. The mold is kept closed for preferably 3 to 10 seconds, more preferably 4 to 6 seconds while the PET melt stream is injected and then cooled by the coolant circulating in the mold.

In the first step, the PET substrate is injection molded by injecting molten PET into the cavities formed by the molds and cores in the mold stack. When the cavity is filled, the resin in the body portion will come into contact with cooling surfaces and the resin in the neck finish will come into contact with the heated thread mold. As the PET in the neck finish cools, it will begin to crystallize as a result of this contact with the relatively hot mold. Once in contact, the crystallization will start and continue at a rate determined by time and temperature. When the neck finish portion of the molds are kept above the minimum temperature of crystallization of the PET used, crystallization will begin on contact. Higher temperatures will increase the rate of crystallization and decrease the time required to reach the optimum level of crystallization while maintaining post mold dimensional stability of the neck finish of the preform. At the same time the resin in the neck finish portion is cooling into a crystallized state, the resin in the body portion or lower body portion of the preform will be in contact with the chilled portions of the mold and thus cooled into an amorphous or semi-crystalline state.

The movable half 142 of the mold is then moved so that the two halves of the mold are separated at or past the point where the newly molded preforms, which remain on the mandrels 98, are clear of the stationary side 144 of the mold. When the mandrels 98 are clear of the stationary side 144 of the mold, the turntable 130 then rotates 180° so that each mandrel 98 having a molded preform thereon is positioned over a preform coating cavity 120. Thus positioned, each of the other mandrels 98 which do not have molded preforms thereon, are each positioned over a preform molding cavity 114. The mold is again closed. Preferably the time between removal from the preform molding cavity 114 to insertion into the preform coating cavity 120 is 1 to 10 seconds, and more preferably 1 to 3 seconds.

When the molded preforms are first placed into preform coating cavities 120, the exterior surfaces of the body portions of the preforms are not in contact with a mold surface. Thus, the exterior skin of the body portion is still softened and hot as described above because the contact cooling is only from the mandrel inside. The high temperature of the exterior surface of the uncoated preform (which forms the inner layer of the coated preform) aids in promoting adhesion between the PET and barrier layers in the finished barrier coated preform. It is postulated that the surfaces of the materials are more reactive when hot, and thus chemical interactions between the barrier material and the virgin PET will be enhanced by the high temperatures. Barrier material will coat and adhere to a preform with a cold surface, and thus the operation may be performed using a cold initial uncoated preform, but the adhesion is markedly better when the overmolding process is done at an elevated temperature, as occurs immediately following the molding of the uncoated preform. As discussed earlier, the neck portion of the preform has desirably crystallized from the separated, thermally isolated cooling fluid systems in the preform molding cavity. Since the coating operation does not place barrier material on the neck portion, its crystalline structure is substantially undisturbed.

A second injection operation then follows in which a melt of a barrier material is injected into each preform coating cavity 120 to coat the preforms. The temperature of the melt of barrier material is preferably 160 to 325° C. The exact temperature range for any individual barrier material is dependent upon the specific characteristics of that barrier material, but it is well within the abilities of one skilled in the art to determine a suitable range by routine experimentation given the disclosure herein. For example, if BLOX 0005 or BLOX 0003 is used, the temperature of the melt (inject temperature) is preferably 160 to 260° C., more preferably 200 to 240° C., and most preferably 175 to 200° C. If the Copolyester Barrier Material B-010 is used, the injection temperature is preferably 160 to 260° C., more preferably 190 to 250° C. During the same time that this set of preforms are being overmolded with barrier material in the preform coating cavities 120, another set of uncoated preforms is being molded in the preform molding cavities 114 as described above.

The two halves of the mold are again separated preferably 3 to 10 seconds, more preferably 4 to 6 seconds following the initiation of the injection step. The preforms which have just been barrier coated in the preform coating cavities 120, are ejected from the mandrels 98. The uncoated preforms which were just molded in preform molding cavities 114 remain on their mandrels 98. The turntable 130 is then rotated 180° so that each mandrel having an uncoated preform thereon is positioned over a coating cavity 120 and each mandrel 98 from which a coated preform was just removed is positioned over a molding cavity 114.

The cycle of closing the mold, injecting the materials, opening the mold, ejecting finished barrier preforms, rotating the turntable, and closing the mold is repeated, so that preforms are continuously being molded and overmolded. Those of skill in the art will appreciate that dry cycle time of the apparatus may increase the overall production cycle time for molding a complete preform.

The process using modified molds and chilled cores will produce a unique combination of amorphous/crystalline properties. As the core is chilled and the thread mold is heated, the thermal transfer properties of the PET act as a barrier to heat exchange. The heated thread molds crystallize the PET at the surface of the thread finish, and the PET material transitions into an amorphous form near the core as the temperature of the PET reduces closer to the core. This variation of the material from the inner (core) portion to the outer (thread) portion is also referred to herein as the crystallinity gradient.

The core temperature and the rate of crystallization of the resin play a part in determining the depth of crystallized resin. In addition, the amorphous inner surface of the neck finish stabilizes the post mold dimensions allowing closer molding tolerances than other crystallizing processes. On the other side, the crystallized outer surface supports the amorphous structure during high temperature filling of the container. Physical properties are also enhanced (e.g. brittleness, impact etc.) as a result of this unique crystalline/amorphous structure.

The optimum temperature for crystallization may vary depending upon factors including resin grade, resin crystallization temperature, intrinsic viscosity, wall thickness, exposure time, mold temperature. Preferred resins include PET homopolymer and copolymers (including but not limited to high-IPA PET, Copolyester Barrier Materials, and copolymers of PET and polyamides) and PEN. Such resins preferably have low intrinsic viscosities and moderate melt temperatures, preferably IVs of about 74 is 86, and melt temperatures of about 220-300° C. The preferred mold temperature range for PET is from about 240-280° C., with the maximum crystallization rate occurring at about 180° C., depending upon the above factors, the preferred exposure time range is from about 20 to 60 seconds overall, which includes both injection steps in inject-over-inject embodiments, and the preferred injection cavity pressure range is about 5000 to 22000 PSI. Thicker finish wall thickness will require more time to achieve a particular degree of crystallinity as compared to that needed for a thinner wall thickness. Increases in exposure time (time in mold) will increase the depth of crystallinity and the overall percentage of crystallinity in the area, and changes in the mold temperature in the region for which crystallinity is desired will affect the crystallinity rate and dimensional stability.

One of the many advantages of using the process disclosed herein is that the cycle times for the process are similar to those for the standard process to produce uncoated preforms; that is the molding and coating of preforms by this process is done in a period of time similar to that required to make uncoated PET preforms of similar size by standard methods currently used in preform production. Therefore, one can make barrier coated PET preforms instead of uncoated PET preforms without a significant change in production output and capacity.

If a PET melt cools slowly, the PET will take on a crystalline form. Because crystalline polymers do not blow mold as well as amorphous polymers, a preform comprised of a body portion of crystalline PET would not be expected to perform as well in forming containers as one having a body portion formed of PET having a generally non-crystalline form. If, however, the body portion is cooled at a rate faster than the crystal formation rate, as is described herein, crystallization of the PET will be minimized and the PET will take on an amorphous or semi-crystalline form. Thus, sufficient cooling of the PET in the body portion of the preform is crucial to forming preforms which will perform as needed when processed.

The rate at which a layer of PET cools in a mold such as described herein is proportional to the thickness of the layer of PET, as well as the temperature of the cooling surfaces with which it is in contact. If the mold temperature factor is held constant, a thick layer of PET cools more slowly than a thin layer. This is because it takes a longer period of time for heat to transfer from the inner portion of a thick PET layer to the outer surface of the PET which is in contact with the cooling surfaces of the mold than it would for a thinner layer of PET because of the greater distance the heat must travel in the thicker layer. Thus, a preform having a thicker layer of PET needs to be in contact with the cooling surfaces of the mold for a longer time than does a preform having a thinner layer of PET. In other words, with all things being equal, it takes longer to mold a preform having a thick wall of PET than it takes to mold a preform having a thin wall of PET.

The uncoated preforms, including those made by the first injection in the above-described apparatus, are preferably thinner than a conventional PET preform for a given container size. This is because in making the barrier coated preforms, a quantity of the PET which would be in a conventional PET preform can be displaced by a similar quantity of one of the preferred barrier materials. This can be done because the preferred barrier materials have physical properties similar to PET, as described above. Thus, when the barrier materials displace an approximately equal quantity of PET in the walls of a preform or container, there will not be a significant difference in the physical performance of the container. Because the preferred uncoated preforms which form the inner layer of the barrier coated preforms are thin-walled, they can be removed from the mold sooner than their thicker-walled conventional counterparts. For example, the uncoated preform can be removed from the mold preferably after about 4-6 seconds without the body portion crystallizing, as compared to about 12-24 seconds for a conventional PET preform having a total wall thickness of about 3 mm. All in all, the time to make a barrier coated preform is equal to or slightly greater (up to about 30%) than the time required to make a monolayer PET preform of this same total thickness.

Additionally, because the preferred barrier materials are amorphous, they will not require the same type of treatment as the PET. Thus, the cycle time for a molding-overmolding process as described above is generally dictated by the cooling time required by the PET. In the above-described method, barrier coated preforms can be made in about the same time it takes to produce an uncoated conventional preform.

The advantage gained by a thinner preform can be taken a step farther if a preform made in the process is of the type in FIG. 4. In this embodiment of a coated preform, the PET wall thickness at 70 in the center of the area of the end cap 42 is reduced to preferably about ⅓ of the total wall thickness. Moving from the center of the end cap out to the end of the radius of the end cap, the thickness gradually increases to preferably about ⅔ of the total wall thickness, as at reference number 68 in the wall portion 66. The wall thickness may remain constant or it may, as depicted in FIG. 4, transition to a lower thickness prior to the support ring 38. The thickness of the various portions of the preform may be varied, but in all cases, the PET and barrier layer wall thicknesses must remain above critical melt flow thickness for any given preform design.

Using preforms 60 of the design in FIG. 4 allows for even faster cycle times than that used to produce preforms 50 of the type in FIG. 3. As mentioned above, one of the biggest barriers to short cycle time is the length of time that the PET needs to be cooled in the mold following injection. If the body portion of a preform comprising PET has not sufficiently cooled before it is ejected from the mandrel, it will become substantially crystalline and potentially cause difficulties during blow molding. Furthermore, if the PET layer has not cooled enough before the overmolding process takes place, the force of the barrier material entering the mold will wash away some of the PET near the gate area. The preform design in FIG. 4 takes care of both problems by making the PET layer thinnest in the center of the end cap region 42, which is where the gate is in the mold. The thin gate section allows the gate area to cool more rapidly, so that the uncoated PET layer may be removed from the mold in a relatively short period of time while still avoiding crystallization of the gate area and washing of the PET during the second injection or overmolding phase.

The physical characteristics of the preferred barrier materials help to make this type of preform design workable. Because of the similarity in physical properties, containers having wall portions which are primarily barrier material can be made without sacrificing the performance of the container. If the barrier material used were not similar to PET, a container having a variable wall composition as in FIG. 4 would likely have weak spots or other defects that could affect container performance.

b. Improving Mold Performance

As discussed above, the mold halves have an extensive cooling system comprising circulating coolant throughout the mold in order to conduct heat away and thus enhance the mold's heat absorption properties. With next reference to FIG. 15, which is a cross-section of a mold mandrel or core 298 and cavity 300 having features in accordance with preferred embodiments, the mold cooling system can be optimized for the mold cavities by arranging cooling tubes 302 in a spiral around the mold cavity 300 and just below the surface 304. The rapid cooling enabled by such a cooling system helps avoid crystallization of the PET layer in the body portion of the preform during cooling. Also, the rapid cooling decreases the production cycle time by allowing injected preforms to be removed from the mold cavities quickly so that the mold cavity 300 may be promptly reused.

As discussed above, the gate area 306 of the mold cavity 300 is especially pivotal in determining cycle time. The void space near the gate 308, which will make up the molded preform's base end 304, receives the last portion of the melt stream to be injected into the mold cavity 300. Thus, this portion is the last to begin cooling. If the PET layer has not sufficiently cooled before the overmolding process takes place, the force of the barrier material melt entering the mold may wash away some of the PET near the gate area 306. To speed cooling in the gate area of the mold cavity in order to decrease cycle time, inserts 310 of an especially high heat transfer material, including, but not limited to, a beryllium-free copper alloy (sold under the trade name AMPCOLOY), can be disposed in the mold in the gate area 308. These AMPCOLOY inserts 310 will withdraw heat at an especially fast rate. To enhance and protect the AMPCOLOY inserts 310, a thin layer of titanium nitride or hard chrome may be deposited on the surface 312 of the AMPCOLOY to form a hard surface. Such a deposited surface would be preferably between only 0.001 to 0.01 inches thick and would most preferably be about 0.002 inches thick.

Figure 16:
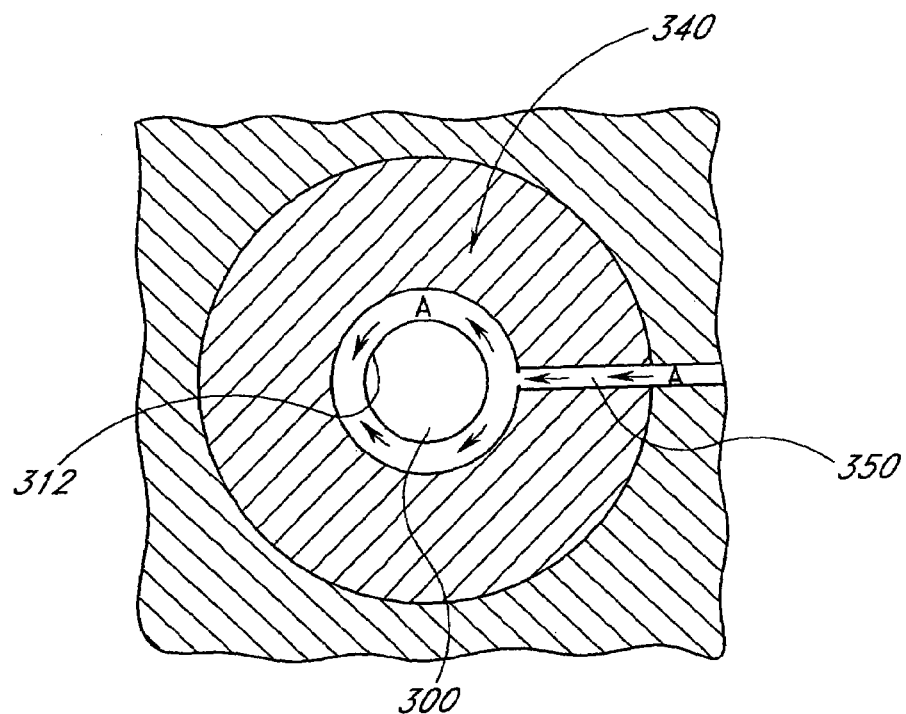
FIG. 16 is a cross-section of the mold of FIG. 15 taken along lines 16-16.
Figure 17:
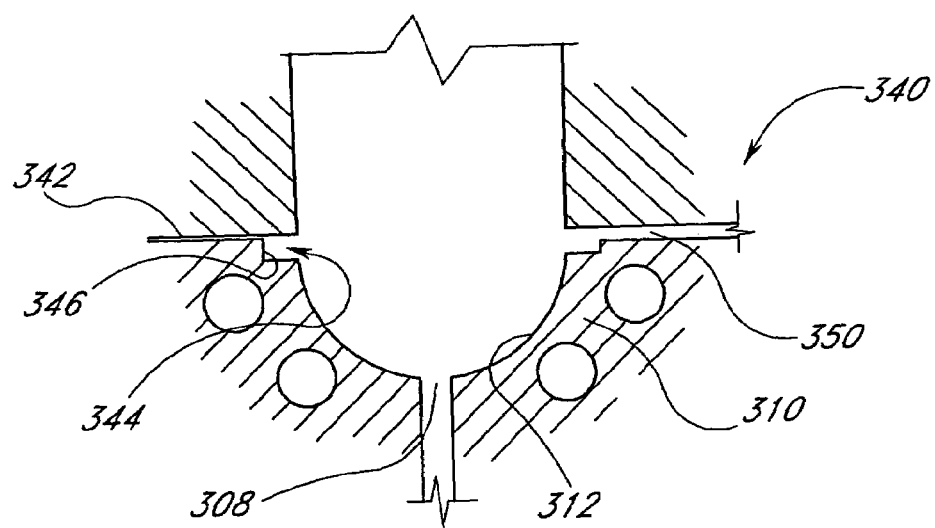
FIG. 17 is a cutaway close up view of the area of FIG. 15 defined by line 17.

As discussed above, the core 298 is especially important in the cooling process because it directly cools the inner PET layer. To enhance the cooling effect of the core 298 on the inner surface of the preform and especially to enhance the cooling effect of the core 298 at the preform's gate area/base end 314, the core 298 is preferably substantially hollow, having a relatively thin uniform wall 320, as shown in FIG. 16. Preferably, this uniform thickness is between 0.1 inch and 0.3 inches and is most preferably about 0.2 inches. It is particularly important that the wall 320 at the base end 322 of the core 298 is no thicker than the rest of the mandrel wall 314 because the thin wall aids in rapidly communicating heat away from the molten gate area 314 of the injected preform.

To further enhance the mandrel's cooling capability, cooling water may be supplied in a bubbler arrangement 330. A core tube 332 is disposed centrally in the core 298 and delivers chilled coolant C to the base end 322 thereof. Since the base end 322 is the first point of the core 298 contacted by this coolant C, the coolant is coldest and most effective at this location. Thus, the gate area 314 of the injected preform is cooled at a faster rate than the rest of the preform. Coolant injected into the mandrel at the base end 322 proceeds along the length of the core 298 and exits through an output line 334. A plurality of ribs 336 are arranged in a spiral pattern around the core tube 332 to direct coolant C along the mandrel wall.

In other embodiments where greater crystallinity and less crystalline gradient is desired, molds which are modified as described above are paired with cores modified as follows. In the modified cores, the fluid circulation in the cores is modified such that, for the portions to form the crystalline preform parts, the fluid circulation is independent and at a relatively higher temperature, or the flow of chilled fluid is restricted or altered in these regions such that the temperature of the surface of the core in the portion which forms the crystalline portion of the preform is higher than that in the body regions. Alternatively, the relevant portions of the core may be heated other means as described above. Use of cores having these characteristics allows for a greater degree of crystallization towards and/or at the inner surface of the preform in the neck, neck finish and/or neck cylinder area and a lesser crystalline gradient between the inner surface and the outer surface in these areas.

Figure 18:
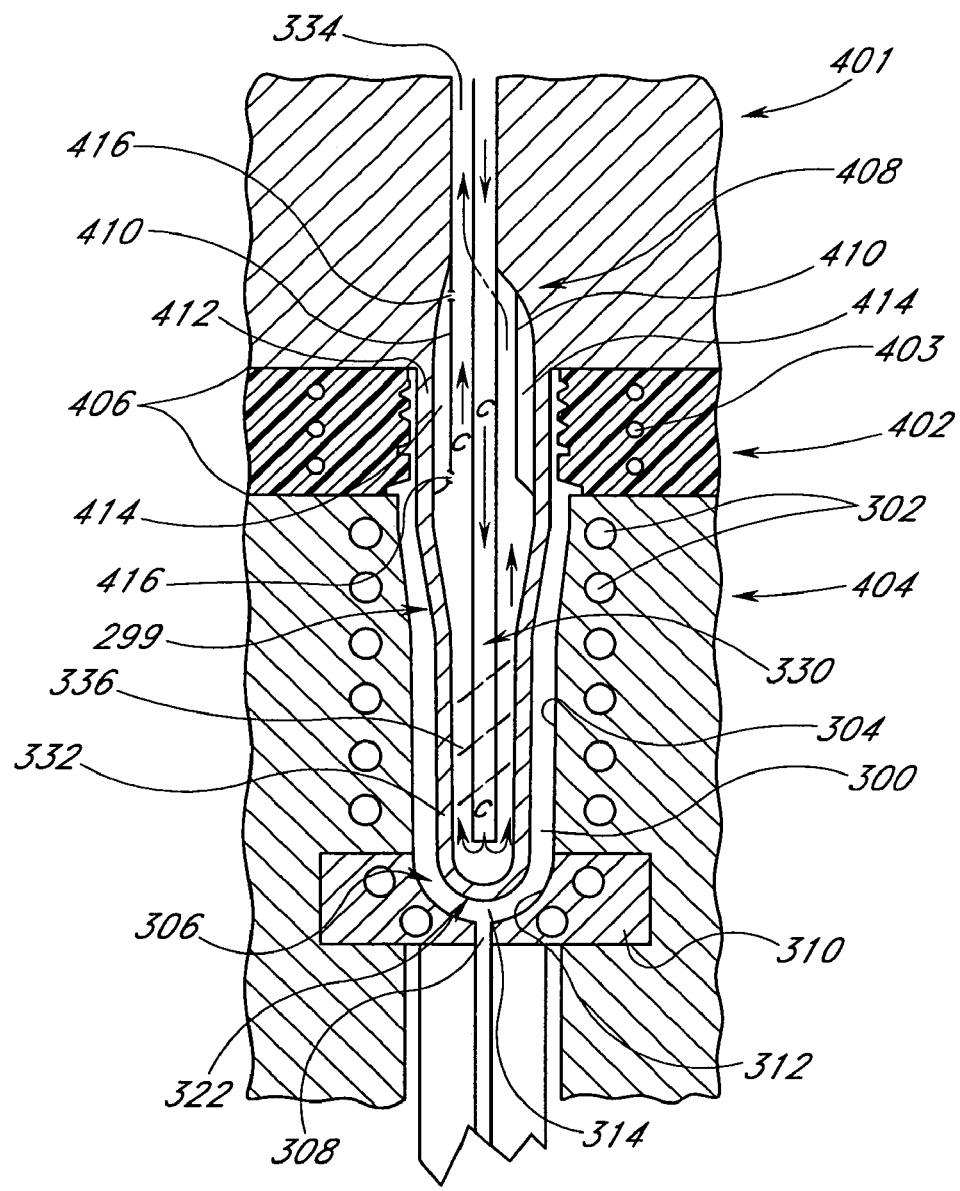
FIG. 18 is a cross-section of an injection mold core having a double wall neck finish portion.

FIG. 18 is a schematic representation of one such modified core 299, configured to achieve greater crystallinity of the neck portion of an injected preform. The mold of FIG. 18 is similar in construction to the mold described above with reference to FIG. 15 and includes a core section 401, the body mold 400, and the neck finish portion 402.

The core 299 of FIG. 18 includes a double wall portion 408 generally adjacent to the neck finish portion 402 of the mold. An inner wall 410 substantially inhibits circulating fluid C from coming into contact with the outer wall 416 of the core 299 in the region proximate the neck finish portion 402 of the mold. In addition, an insulating space 414 is defined between the inner wall and outer wall 412. Accordingly, the insulating space 414 reduces the cooling effect of the circulating fluid C on the neck portion of a preform within the mold cavity 300 thereby increasing the crystallinity of the resulting preform, and reducing the crystallinity gradient between the outer surface and the inner surface of the resulting preform.

The inner wall 410 of the modified core 299 may optionally include one or more openings 416. These openings 416 permit circulating fluid C to enter the insulating space 414. Preferably, the size of the openings 416 are configured such that a limited amount of circulating fluid C enters the insulating space 414. Such a construction provides a greater cooling effect on the neck portion of the resulting preform than when no fluid is permitted within the insulating space 414, but less cooling than unrestricted contact of the circulating fluid C with the outer wall 412 of the core 299. Advantageously, adjustment of the size and placement of the openings 416 allows adjustment of the cooling on the neck portion of the injected preform, thereby allowing adjustment of the crystallinity and crystallinity gradient in the neck portion.

Figure 19:
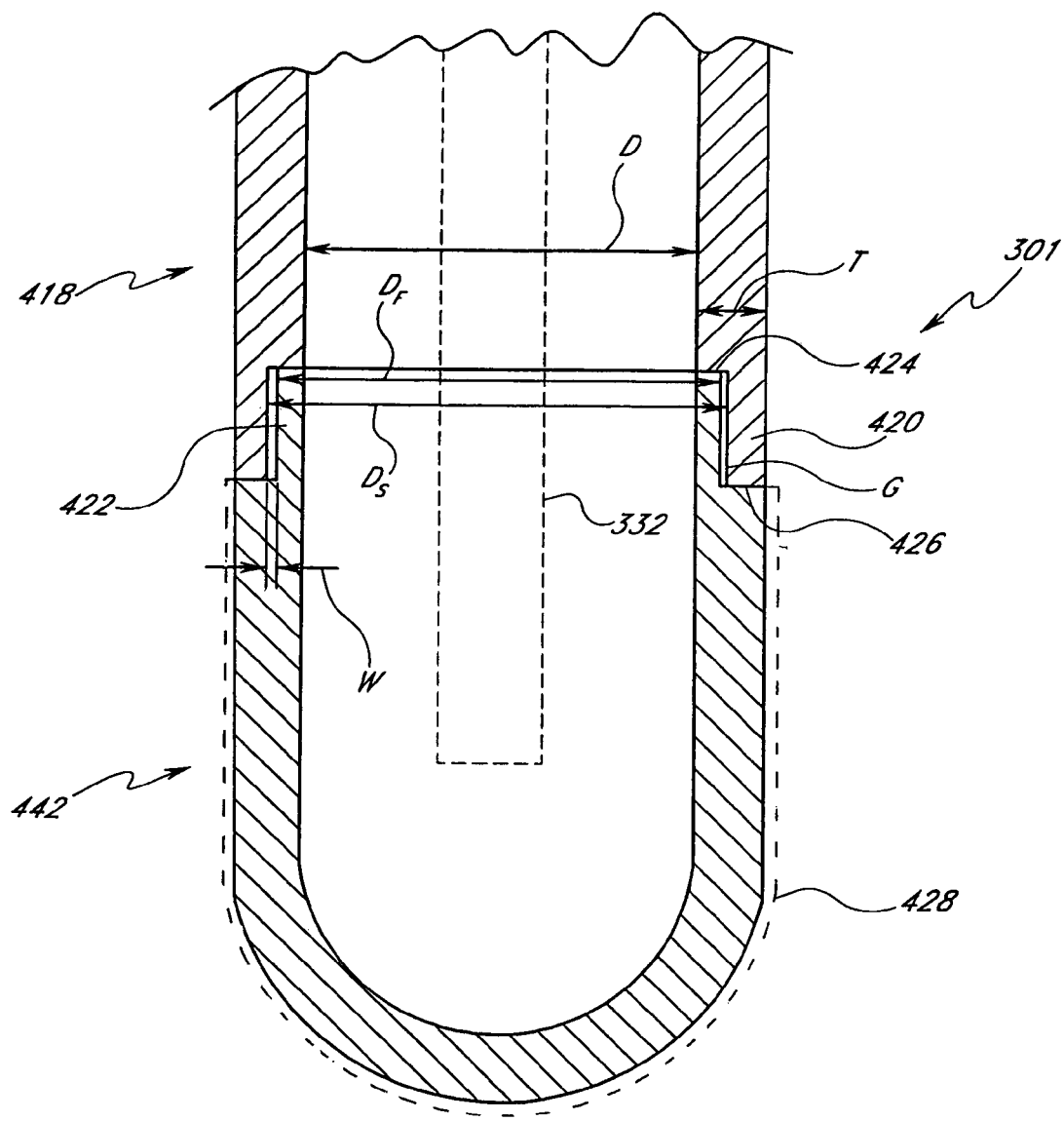
FIG. 19 is a cross-section of an enhanced injection mold core having a high heat transfer base end portion.

FIG. 19 is a schematic representation of another embodiment of a mandrel, or core 301, including a modified base end 442 or tip. The mold core 301 of FIG. 19 is similar in construction to the mold described above with reference to FIG. 15.

As described above, the end cap portion of the injection molded preform adjacent the base end 322, receives the last portion of the melt stream to be injected into the mold cavity 300. Thus, this portion is the last to begin cooling. If the PET layer has not sufficiently cooled before the overmolding process takes place, the force of the barrier material melt entering the mold may wash away some of the PET near the base end 322 of the core 301. To speed cooling in the base end 322 of the core 301 in order to decrease cycle time, the modified core 301 includes a base end 442 portion constructed of an especially high heat transfer material, preferably a beryllium-free copper alloy, such as AMPCOLOY. Advantageously, the AMPCOLOY base end 442-allows the circulating fluid C to withdraw heat from the injected preform at a higher rate than the remainder of the core 301. Such a construction allows the end cap portion of the preform to cool quickly, in order to decrease the necessary cooling time and, thus, reduce the cycle time of the initial preform injection.

The modified core 301 illustrated in FIG. 19 generally comprises an upper core portion 418, substantially as illustrated in FIG. 15, and a base end portion 442 constructed of a high heat transfer material, including, but not limited to, a beryllium-free copper alloy, such as AMPCOLOY. A core tube 332, substantially as described above, is illustrated in phantom. As in FIG. 15, the present core tube 332 is operable for delivering circulating cooling fluid to the base end 442 of the core 301.

The core 301 is substantially hollow and defines an inner diameter D and wall thickness T. The upper core portion 418 includes a recessed step 420 having a diameter $D_S$ which is greater than the inner diameter D of the core 301. The base end portion 422 includes a flange 422 having a diameter $D_F$ which is smaller than the diameter $D_S$ of the step 420. The difference between the diameters $D_S$ and $D_F$ of the step 420 and flange 422, respectively, is preferably between 0.000 and 0.025 inches. More preferably, the difference is between 0.010 and 0.015 inches. When the base end portion 442 is placed concentrically within the upper core portion 418, the difference in the diameters $D_S$, $D_F$ results in a gap G being formed between the base end and upper core portions 442, 418. The width W of the gap G is approximately equal to one-half the difference between the diameters $D_S$, $D_F$. Additionally, the base end portion 442 is preferably about 0.750-1.250 inches in length.

Preferably, the modified core 301 is constructed by starting with an unmodified core 298 made from a single material, substantially as illustrated in FIG. 15. The end portion, or tip, of the unmodified core 298 is cut off approximately at the point where the high heat transfer base end 442 is desired to begin. A drilling, or boring, tool may then be inserted from the end portion of the core 301 to ensure that the inner diameter D is correctly sized and concentric with a center axis of the core 301. This also ensures that the wall thickness T is consistent throughout the portion of the core 301 which is in contact with the injected preform, thus ensuring that the cooling of the preform is consistent as well. Such a method of construction presents a distinct advantage over conventionally formed cores. In a conventional core, because the length to diameter ratio is large, the drilling tool used to create the hollow inner portion of the core often tends to wander, that is, tends to deflect from the center axis of the core. The wandering of the drilling tool results in a core having an inconsistent wall thickness and, thus, inconsistent heat transfer properties. With the above-described method of sizing the inner diameter D from the base end of the core 301, the problem of tool wandering is substantially reduced or eliminated. Therefore, a consistent wall thickness T and, as a result, consistent heat transfer properties are achieved.

The upper core portion 418 and base end portion 442 are preferably joined by a silver solder process. AMPCOLOY is a preferred material for the base end portion 442 in part because it contains some silver. This allows the silver solder process to provide a joint of sufficient strength to be useful in injection molding applications. Preferably, the soldering process results in a full contact joint. That is, solder material is disposed on all of the mating surfaces (424, 426 and gap G) between the upper core portion 418 and base end portion 442. Advantageously, the provision of the gap G enhances the flow of solder material such that a strong joint is achieved. In addition, the full contact joint is advantageous because it provides for consistent heat transfer properties and high strength. If the soldered joint was not a full contact joint, any air present in the gap G would result in inconsistent heat transfer through the gap G portion of the core 301. Although it is preferred to join the upper core portion 418 and base end portion 442 with a silver solder process, other suitable joining processes may also be used.

As illustrated in FIG. 19, the base end portion 442 of the modified core 301 is preferably of a larger size than the final dimension desired (illustrated by the dashed line 428) when it is joined to the upper core portion 418. Advantageously, this allows for the base end portion 442 to be machined to its desired dimension after assembly to the upper core portion 418 in order to ensure a proper final diameter and a smooth surface at the transfer from the upper core portion 418 to the base end portion 442.

Another way to enhance cooling of the preform's gate area was discussed above and involves forming the mold cavity so that the inner PET layer is thinner at the gate area than at the rest of the injected preform as shown in FIG. 4. The thin gate area thus cools quickly to a substantially solid state and can be quickly removed from the first mold cavity, inserted into the second mold cavity, and have a layer of barrier material injected thereover without causing washing of the PET.

In the continuing effort to reduce cycle time, injected preforms are removed from mold cavities as quickly as possible. However, it may be appreciated that the newly injected material is not necessarily fully solidified when the injected preform is removed from the mold cavity. This results in possible problems removing the preform from the cavity 300. Friction or even a vacuum between the hot, malleable plastic and the mold cavity surface 304 can cause resistance resulting in damage to the injected preform when an attempt is made to remove it from the mold cavity 300.

Typically, mold surfaces are polished and extremely smooth in order to obtain a smooth surface of the injected part. However, polished surfaces tend to create surface tension along those surfaces. This surface tension may create friction between the mold and the injected preform which may result in possible damage to the injected preform during removal from the mold. To reduce surface tension, the mold surfaces are preferably treated with a very fine sanding device to slightly roughen the surface of the mold. Preferably the sandpaper has a grit rating between about 400 and 700. More preferably a 600 grit sandpaper is used. Also, the mold is preferably sanded in only a longitudinal direction, further facilitating removal of the injected preform from the mold.

During injection, air is pushed out of the mold cavity 300 by the injected meltstream. As a result, a vacuum may develop between the injected preform and the mold cavity wall 304. When the injected preform is removed from the cavity 300, the vacuum may resist removal, resulting in damage to the not-fully-solidified preform. To defeat the vacuum, an air insertion system 340 may be employed. With additional reference to FIGS. 16 and 17, an embodiment of an air insertion system 340 is provided. At a joint 342 of separate members of the mold cavity 300, a notch 344 is preferably formed circumferentially around and opening into the mold cavity 300. The notch 344 is preferably formed by a step 346 of between 0.002 inches and 0.005 inches and most preferably about 0.003 inches in depth. Because of its small size, the notch 344 will not fill with plastic during injection but will enable air A to be introduced into the mold cavity 300 to overcome the vacuum during removal of the injected preform from the mold cavity 300. An air line 350 connects the notch 344 to a source of air pressure and a valve (not shown) controls the supply of air A. During injection, the valve is closed so that the melt fills the mold cavity 300 without air resistance. When injection is complete, the valve opens and a supply of air is delivered to the notch 344 at a pressure between about 75 psi and 150 psi and most preferably about 100 psi. The supply of air defeats any vacuum that may form between the injected preform and the mold cavity, aiding removal of the preform. Although the drawings show only a single air supply notch 344 in the mold cavity 300, any number of such notches may be provided and in a variety of shapes depending on the size and shape of the mold.

While some of the above-described improvements to mold performance are specific to the method and apparatus described herein, those of skill in the art will appreciate that these improvements may also be applied in many different types of plastic injection molding applications and associated apparatus. For instance, use of AMPCOLOY in a mold may quicken heat removal and dramatically decrease cycle times for a variety of mold types and melt materials. Also, roughening of the molding surfaces and provides air pressure supply systems may ease part removal for a variety of mold types and melt materials.

Figure 20:
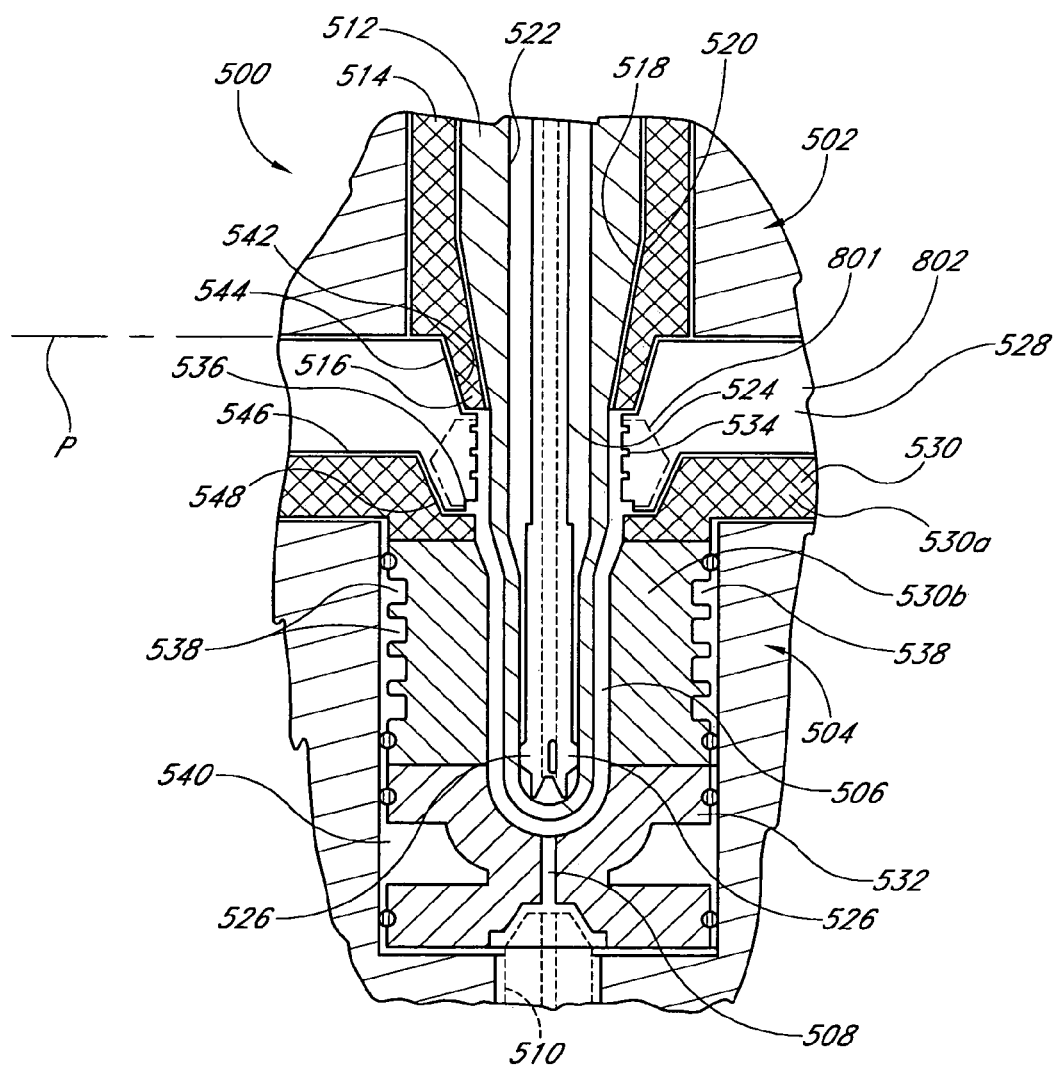
FIG. 20 is a cross-section of yet another injection mold utilizing a combination of hardened material components and high heat transfer material components.

FIG. 20 illustrates an injection mold assembly, similar to those described above, and referred to generally by the reference numeral 500. The injection mold assembly 500 is configured to produce an injection molded, plastic preform. In the illustrated arrangement, the mold 500 utilizes one or more hardened materials to define contact surfaces between various components of the mold 500. As used herein, the term "hardened material" is a broad term and is used in its ordinary sense and refers, without limitation, to any material which is suitable for preventing wear, such as tool steel. In various embodiments, the hardened or wear resistant material may comprise a heat-treated material, alloyed material, chemically treated material, or any other suitable material. The mold 500 also uses one or more materials having high heat transfer properties to define at least a portion of the mold cavity surfaces, as is described in greater detail below. The mold 500 may also utilizes the hardened materials (having generally slower heat transfer properties) to produce a preform having regions with varying degrees of crystallinity, similar to the injection molds described above.

As in the mold arrangements described above, the mold assembly 500 comprises a core section 502 and a cavity section 504. The core section 502 and the cavity section 504 define a parting line P, indicated generally by the dashed line of FIG. 20, between them. The core section 502 and the cavity section 504 cooperate to form a mold cavity 506, which is generally shaped in the desired final shape of the preform. The cavity section 504 of the mold 500 defines a passage, or gate 508, which communicates with the cavity 506. An injection nozzle 510 delivers a molten polymer to the cavity 506 through the gate 508.

Preferably, the core section 502 of the mold 500 includes a core member 512 and a core holder 514. The core holder 514 is sized and shaped to be concentric about, and support a proximal end of, the core member 512. The core member 512 extends from an open end 516 of the core holder 514 and extends into the cavity section 504 of the mold to define an internal surface of the cavity 506 and thus, an internal surface of the final preform. The core member 512 and the core holder 514 include cooperating tapered portions 518, 520, respectively, which locate the core member 512 relative to the core holder 514.

Preferably, the core member 512 is substantially hollow, thus defining an elongated cavity 522 therein. A core tube, or bubbler tube 524, extends toward a distal end of the core cavity 522 to deliver a cooling fluid to the distal end of the cavity 522. As in the previous arrangements, cooling fluid is delivered to the end of the core member 512, and progresses through the cavity 522 toward the base of the core member 512. Preferably, the bubbler tube 524 is CNC machined for greater accuracy. In addition, a plurality of tangs 526 extend radially outward from the body of the bubbler tube 524 and contact the inner surface of the cavity 522 to maintain the tube 524 in a coaxial relationship with the core member 512. Such a construction inhibits vibration of a distal end of the bubbler tube 524, thus improving the dimensional stability of the preforms produced by the mold 500.

The cavity section 504 of the mold 500 generally includes a threaded finish portion 528, a main cavity section 530 and a gate portion 532. All of these portions 528, 530, 532 cooperate to define an outer surface of the cavity 506, and thus an outer surface of the finished preform produced by the mold 500. The distal end of the core member 512 correlates to the distal end of the cavity 506. The thread finish portion 528 is positioned adjacent the core section 502 of the mold 500 and cooperates with the core section 502 to define the parting line P. The thread finish portion 528 defines the threads 534 and neck ring 536 portions of the cavity 506, and thus of the final preform. Preferably, the thread finish portion 528 comprises two semicircular portions, which cooperate to define the thread finish portion of the cavity 506 so that the thread finish portion 528 may be split apart from one another, in a plane perpendicular to the plane of separation between the core section 502 and cavity section 504, to permit removal of the finished preform from the cavity 506, as is known in the art.

The main cavity section 530 defines the main body portion of the cavity 506. Desirably, the main cavity section 530 also defines a plurality of cooling channels 538, which direct cooling fluid around the main body portion 530 to cool the preform within the cavity 506.

The gate portion 532 of the mold 500 is interposed between the main cavity section 530 and the injection nozzle 510 and defines at least a portion of the gate 508. The gate portion 532 defines one large cooling channel 540, but any number of smaller cooling channels may be alternatively be provided.

The mold 500 defines a number of contact surfaces defined between the various components that make up the mold 500. For example, in the illustrated arrangement, the core section 502, and specifically the core holder 514 defines a contact surface 542 that cooperates with a contact surface 544 of the cavity section 504 and, more specifically, the thread finish portion 528 of the mold 500. Similarly, the opposing side of the thread finish portion 528 defines a contact surface 546 that cooperates with a contact surface 548 of the main cavity section 530.

The corresponding contact surfaces 542, 544 and 546, 548 intersect the mold cavity 506 and, therefore, it is desirable to maintain a sufficient seal between the contact surfaces 542, 544 and 546, 548 to inhibit molten polymer within the cavity 506 from entering between the respective contact surfaces. Preferably, the corresponding contact surfaces 542, 544 and 546, 548 include mating tapered surfaces, generally referred to as taper locks. Due to the high pressure at which molten polymer is introduced into the cavity 506, a large clamp force is utilized to maintain the core section 502 and the cavity section 504 of the mold in contact with one another and maintain a good seal between the contact surfaces 542, 544 and 546, 548. As a result of such a high clamp force, it is desirable that the components of the mold 500 defining the contact surfaces are formed from a hardened material, such as tool steel, for example, to prevent excessive wear to these areas and increase the life of the mold.

Furthermore, as described in detail throughout the present application, it is also desirable that at least a portion of the mold 500 that defines the cavity 506 be made of a high heat transfer material, such as AMPCOLOY. Such an arrangement permits rapid heat withdrawal from the molten polymer within the cavity 506, which cools the preform to a solid state so that the cavity sections 502 and 504 may be separated and the preform removed from the mold 500. As described above, the rate of cooling of the preform is related to the cycle time that may be achieved without resulting in damage to the preform once it is removed from the mold 500.

A decrease in cycle time means that more parts may be produced in a given amount of time, therefore reducing the overall cost of each part. However, high heat transfer materials that are preferred for at least portions of the molding surface of the cavity 506 are generally too soft to withstand the repeated high clamping pressures that exist at the contact surfaces 542, 544 and 546, 548, for example. Accordingly, if an entire mold were to be formed from a high heat transfer material, the relatively short life of such a mold would not justify the decrease in cycle time that may be achieved by using such materials. The illustrated mold 500 of FIG. 20, however, is made up of individual components strategically positioned such that the contact surfaces 542, 544 and 546, 548 comprise a hardened material, such as tool steel, while at least a portion of the mold 500 defining the cavity 506 comprises a high heat transfer material, to reduce cycle time.

In the illustrated embodiment, the core holder 514 is desirably constructed of a hardened material while the core member 512 is constructed from a high heat transfer material. Furthermore, the thread finish portion 528 of the mold desirably is constructed of a hardened material. The main cavity section 530 preferably includes a hardened material portion 530a and a high heat transfer material portion 530b. The hardened material portion 530a could be made from the same material the thread finish portion 528. The hardened material portion 530a could be made from a different material than the thread finish portion 528. Preferably, the hardened material portion 530a defines the contact surface 548 while the high heat transfer material portion 530b defines a significant portion of the mold surface of the cavity 506. The high heat transfer material portion 530b and the gate portion 532 may be made from the same or different material. The hardened material portion 530a and the high heat transfer material portion 530b of the main cavity section 530 may be coupled in any suitable manner, such as a silver soldering process as described above, for example. Furthermore, the gate portion 532 of the mold 500 is also desirably formed from a high heat transfer material, similar to the molds described above.

In one embodiment, the thread finish portion 528 comprises a contact portion 802 coupled to a threaded insert 801. The contact portion 802 is positioned adjacent the core section 502 of the mold 500 and cooperates with the core section 502 to define the parting line P. Preferably, the contact portion 802 is made from a hardened material, such as tool steel. The threaded insert 801 can define the threads 534 and the neck ring 536 portion of the cavity 506. The threaded inserts 801 can be coupled to the contact portion 802 and can be formed from a high heat transfer material. Of course, the threaded insert 801 and the contact portion 802 can form a portion of the threads 534 and/or neck ring 536 and the proximal end of the cavity 506.

With a construction as described above, advantageously the mold 500 includes hardened materials at the contact surfaces 542, 544 and 546, 548 to provide a long life to the mold 500. In addition, the mold 500 also includes high heat transfer materials defining at least a portion of the molding surfaces of the cavity 506 such that cycle times may be reduced and, therefore, through-put of the mold 500 is increased. Such an arrangement is especially advantageous in molds designed to form preforms, which are later blow molded into a desired final shape.

Another benefit of the mold 500 is that the hardened material thread finish portion 528 has a lower rate of heat transfer than the high heat transfer portions of the mold 500. Accordingly, the neck finish of the preform may become semi-crystalline or crystalline, which allows the neck finish to retain it's formed dimensions during a hot-fill process. Furthermore, the portion of the core member 512 adjacent the thread finish portion 528 is preferably high heat transfer material, which rapidly cools the inner surface of the thread finish of the preform, thereby allowing the preform to maintain it's formed dimensions when removed from the mold in a less than fully cooled state. The cycle time may be reduced from 15%-30% utilizing a mold construction such as mold 500 in comparison with a mold made from conventional materials and construction techniques. In addition, certain portions of the mold 500 may be replaced, without necessitating replacement of the entire mold section. For example, the core member 512 and core holder 514 may be replaced independently of one another.

F. Formation of Preferred Containers by Blow Molding

The coated containers preferably produced by blow-molding the coated preforms, the creation of which is disclosed above. The coated preforms can be blow-molded using techniques and conditions very similar to those by which uncoated PET preforms are blown into containers. In other preferred embodiments in which it is desired for the entire container to be heat-set, it is preferred that the containers be blow-molded in accordance with processes generally known for heat set blow-molding, including, but not limited to, those which involve orienting and heating in the mold, and those which involve steps of blowing, relaxing and reblowing.

For example, for preforms in which the neck finish is formed primarily of PET, the preform is heated to a temperature of preferably 80 to 120° C., with higher temperatures being preferred for the heat-set embodiments, and given a brief period of time to equilibrate. After equilibration, it is stretched to a length approximating the length of the final container. Following the stretching, pressurized air is forced into the preform which acts to expand the walls of the preform to fit the mold in which it rests, thus creating the container.

Although the present invention has been described herein in terms of certain preferred embodiments, and certain exemplary methods, it is to be understood that the scope of the invention is not to be limited thereby. Instead, Applicant intends that variations on the methods and materials disclosed herein which are apparent to those of skill in the art will fall within the scope of Applicant's invention.

What is claimed is:

1. An injection mold assembly, comprising:
   a cavity section having a first portion, a gate portion and a second portion positioned between the first portion and the gate portion, the first portion comprising a hardened material that defines a cavity contact surface, and the second portion comprising a high heat transfer material and at least partially defining a cavity mold surface;
   a core section having at least a core contact surface and a core mold surface, a portion of the core section forming the core contact surface comprising a hardened material; and
   a mold cavity having a distal and a proximal end and formed between the cavity section and the core section when a portion of the cavity contact surface and a portion of the core contact surface are in contact, the distal end of the mold cavity formed by the gate portion of the cavity section.

2. The injection mold assembly of claim 1, wherein the second portion comprises a high heat transfer material and defines a significant portion of the cavity mold surface.

3. The injection mold assembly of claim 1, wherein the first portion of the cavity section forming the cavity contact surface comprises a threaded finish portion, the threaded finish portion having a lower rate of heat transfer than the second portion of the cavity section.

4. The injection mold assembly of claim 1, wherein the first portion of the cavity section forming the contact surface comprises steel and the second portion comprises beryllium coated with a hardened metal.

5. The injection mold assembly of claim 1, wherein the core section comprises an elongated core having an upper core portion and a tip, the upper core portion forming a substantial portion of the elongated core and the tip having a greater rate of heat transfer than the upper portion.

6. The injection mold assembly of claim 5, wherein the upper core portion and the tip are configured to mate to form the core mold surface, wherein the core mold surface is substantially smooth.

7. The injection mold assembly of claim 6, wherein the upper core portion and the tip each comprises a cylindrical flange, the flanges being configured to mate with each other.

8. The injection mold assembly of claim 7, further comprising solder that helps couple the tip to the upper core portion.

9. The injection mold assembly of claim 1, wherein the core section comprises a high heat transfer portion disposed adjacent to the distal end of the mold cavity, the high heat transfer portion comprising a material having a greater rate of heat transfer than the portion of the core section adjacent to the proximal end of the mold cavity.

10. An injection mold assembly, comprising:
a mold cavity having an internal surface and an external surface, the external surface having a region configured to surround a gate;
a core section comprising a core member and a core holder, the core holder holding the core member, and the core member defining at least a portion of the internal surface of the mold cavity;
a cavity section comprising an upper hardened portion and a gate portion, the upper hardened portion forming a lower contact surface and comprising a hardened material, and the gate portion comprising a high heat transfer material forming the region of the external surface surrounding the gate, each of the upper hardened portion and the gate portion at least partially defining the external surface of the mold cavity.

11. The injection mold assembly of claim 10, wherein the core member has a proximal and a distal end, and the core holder is generally concentric about the proximal end of the core member.

12. The injection mold assembly of claim 10, wherein the core member at least partially defines the internal surface of the mold cavity.

13. The injection mold assembly of claim 10, wherein the core member comprises an upper core portion and a base end portion, the base end portion generally comprising a greater rate of heat transfer than the upper core portion.

14. The injection mold assembly of claim 13, wherein the upper core portion and the base end portion at least partially form the internal surface of the mold cavity, and wherein the core member has a greater rate of heat transfer than the upper hardened portion of the cavity section.

15. The injection mold assembly of claim 10, wherein the core section further comprises a core hardened portion having a hardened material, and wherein a parting line is disposed between the upper hardened portion of the cavity section and the core hardened portion.

16. The injection mold assembly of claim 15, wherein the upper hardened portion defines a threaded portion of the external surface, and the cavity section further comprises:
a hardened main cavity portion formed of a hardened material, the hardened main cavity portion at least partially defining of the external surface of the mold cavity, and the hardened main cavity portion being positioned between the upper hardened portion and the gate portion of the cavity section; and
a high heat transfer cavity portion having a lower rate of heat transfer than the gate portion, the high heat transfer cavity portion being positioned between the upper hardened portion and the gate portion of the cavity section.

17. The injection mold assembly of claim 16, wherein the hardened main cavity portion is adjacent to the upper hardened portion of the cavity section, and the high heat transfer cavity portion is adjacent to the gate portion of the cavity section.

18. The injection mold assembly of claim 17, wherein the hardened main cavity portion is adjacent to the high heat transfer cavity portion.

19. The injection mold assembly of claim 16, wherein the hardened main cavity portion comprises a hardened material while the high heat transfer cavity portion comprises a high heat transfer material.

20. The injection mold assembly of claim 16, wherein the high heat transfer cavity portion defines more of the external surface than the hardened cavity section.

21. The injection mold assembly of claim 16, wherein the core member comprises a portion with a substantially uniform cross section along its longitudinal axis, and the mold cavity comprises a substantially uniform cross section between the portion of the core section with a substantially uniform cross section and the high heat transfer cavity portion.

22. A preform mold assembly, comprising:
a core section having a core contact surface formed of a hardened material; and
a cavity section comprising an upper portion, a gate portion and an intermediate portion positioned between the upper portion and the gate portion, the upper portion comprising a hardened material and having an upper contact surface configured to mate and contact the core contact surface, and the gate portion and the intermediate portion comprising a high heat transfer material.

23. The preform mold assembly of claim 22, further comprising a preform mold cavity when the core contact surface contacts the upper contact surface of the upper portion, the preform mold cavity having a longitudinal axis, wherein the intermediate portion surrounds more of the longitudinal axis of the preform mold cavity than the upper portion.

24. The preform mold assembly of claim 22, wherein the core section comprises a core having a distal end formed of a high heat transfer material.

25. An injection mold assembly, comprising:
a lower portion;
an upper portion;
a mold cavity formed when a mating surface of the lower portion contacts an adjacent mating surface of the upper portion, the mold cavity having a distal end and a proximal end;

means for mating the lower portion and the upper portion; and means for transferring heat at a first rate from the distal end of the mold cavity and a second rate from the proximal end of the mold cavity;

wherein the mating surface of the lower portion comprises a hardened material; and wherein the first rate of transferring heat is greater than the second rate of transferring heat.

26. The injection mold assembly of claim 25, wherein the lower portion comprises a cavity section and the upper portion comprises a core section.

27. An injection mold assembly comprising a contact portion, the contact portion comprising:
   an upper portion comprising a wear resistant material adapted to contact and mate with a core section of the mold assembly; and
   a lower portion comprising a wear resistant material adapted to connect with a cavity section of the mold assembly; and
   an insert positioned between the upper portion and the lower portion, the insert comprising a high heat transfer material and defining a cavity mold surface.

28. The mold assembly of claim 27, wherein the contact portion defines a threaded section of the cavity mold surface.

29. An injection mold assembly, comprising:
   a cavity section; and
   a core section comprising a core member and a core holder, the core member having a proximal end and a distal end, and the core holder configured to support the core member at the proximal end of the core member;
   wherein the core holder comprises a hardened material configured to contact an adjacent mating surface of the cavity section; and
   wherein the core member comprises a high heat transfer material, the core member defining at least a portion of a cavity mold surface.

30. The mold assembly of claim 29, wherein the core holder is at least partially concentrically situated around the core member.

31. The mold assembly of claim 29, wherein the core holder and the core member comprise cooperating tapered portions, the cooperating tapered portions configured to position the core member relative to the core holder.

32. The mold assembly of claim 29, wherein the core member comprises an internal channel, the internal channel extending toward the distal end of the core member.

33. An injection mold assembly comprising:
   a core section; and
   a cavity section, the cavity section comprising:
      a first portion comprising a hardened material that defines a contact surface; and
      a second portion having a top end and a bottom end, the second portion comprising a high heat transfer material;
      wherein the first portion is situated immediately adjacent to the top end of the second portion.

34. The mold assembly of claim 33, wherein the contact surface of the first portion is configured to contact a mating surface, the mating surface comprising a hardened material.

35. The mold assembly of claim 34, wherein the mating surface comprises a surface of the core member.

36. The mold assembly of claim 34, wherein the cavity section further comprises a third portion, the third portion being positioned between the core section and first portion of the cavity section, and wherein the third portion comprises the mating surface.

37. The mold assembly of claim 36, wherein the third portion comprises a neck finish mold.

38. The mold assembly of claim 33, wherein the cavity section further comprises a gate portion, the second portion being positioned between the gate portion and the first portion.

* * * * *